United States Patent [19]
Ohtsu et al.

[11] Patent Number: 5,928,525

[45] Date of Patent: Jul. 27, 1999

[54] METHOD FOR OPTICAL FIBER WITH TAPERED END CORE PROTRUDING FROM CLAD

[75] Inventors: Motoichi Ohtsu, Tokyo; Shuji Mononobe, Kanagawa; Uma Maheswari Rajagopalan, Saitama, all of Japan

[73] Assignee: Kanagawa Academy of Science and Technology, Kanagawa-Ken, Japan

[21] Appl. No.: 09/095,352

[22] Filed: Jun. 9, 1998

Related U.S. Application Data

[62] Division of application No. 08/704,615, Jan. 17, 1997, Pat. No. 5,812,723.

[30] Foreign Application Priority Data

Mar. 24, 1994 [JP] Japan .................................. 6-53626
Mar. 25, 1994 [JP] Japan .................................. 6-55697

[51] Int. Cl.$^6$ .................................................. C03C 25/06
[52] U.S. Cl. ............................. 216/24; 216/11; 216/97
[58] Field of Search ................... 216/11, 24, 97; 65/429

[56] References Cited

U.S. PATENT DOCUMENTS

| | | | |
|---|---|---|---|
| 4,265,699 | 5/1981 | Ladany ........................... | 216/97 |
| 4,445,751 | 5/1984 | Divens et al. .................. | 216/90 |
| 4,986,620 | 1/1991 | Severijns et al. ............ | 350/96.15 |
| 5,100,507 | 3/1992 | Cholewa et al. ............. | 216/97 |
| 5,200,024 | 4/1993 | Blonder et al. .............. | 216/99 |
| 5,290,398 | 3/1994 | Feldman et al. ............. | 216/97 |
| 5,459,803 | 10/1995 | Yamane et al. .............. | 385/33 |
| 5,480,046 | 1/1996 | Filas et al. ................... | 216/97 |
| 5,566,262 | 10/1996 | Yamane et al. .............. | 385/33 |
| 5,664,036 | 9/1997 | Islam ............................ | 385/31 |

OTHER PUBLICATIONS

Pangaribuan, T. et al "Reproducible Fabrication Technique of Nanometric Tip Diameter Fiber Probe for Photon Scanning Tunneling Microscope" Jpn. J. Appl. Phys. vol. 31, Part 2, No. 9A, pp. L1302–L1304, Sep. 1992.

*Primary Examiner*—Bruce Breneman
*Assistant Examiner*—Anita Alanko
*Attorney, Agent, or Firm*—Jay H. Maioli

[57] ABSTRACT

An optical fiber made up of a core for propagating the light and a clad covering the core for confining the light propagated in the core. The optical fiber has a tapering protrusion at the apex for entrance and exiting of light. The optical fiber is used in a photon scanning tunneling microscope detecting the evanescent light localized in an area smaller in size than the wavelength of light on the surface of an sample as an optical probe disposed in proximity to the surface of the sample for scattering the evanescent light for detecting the scattered light. The optical fiber is optically coupled to an optical waveguide for constituting an optically coupled element. With this optically coupled element, a protrusion of the optical fiber operates as a collection unit for collecting the light propagated in the core. The light collected by the protrusion enters the optical waveguide.

12 Claims, 21 Drawing Sheets

METHOD FOR OPTICAL FIBER WITH TAPERED END CORE PROTRUDING FROM CLAD

This is a division of prior application Ser. No. 08/704,615 filed Jan. 17, 1997 now U.S. Pat. No. 5,812,723.

TECHNICAL FIELD

This invention relates to an optical fiber made up of a core for propagating light and a clad sheathing this core for confining the light propagated in the core, and having a protrusion for light input/output, and the method for producing the same.

BACKGROUND ART

A photon scanning tunneling microscope for detecting the evanescent light localized in small-sized areas on an sample surface smaller than the wavelength of light has been known as an ultra-high resolution optical microscope having resolution beyond the diffraction limit of a conventional optical microscope.

For example, if the sample surface of a sample 50 is irradiated from its back surface under total internal reflection conditions, an evanescent field is generated on the sample surface depending on the surface shape, as shown in FIG. 1.

With the photon scanning tunneling microscope, the intensity of the evanescent field is measured with an optical probe 52 having a sharpened core 51 with an aperture smaller than the wavelength of the evanescent light, as shown for example in FIG. 2. That is, if the apex of the sharpened core 51 is approached to less than a distance on the order of the evanescent optical wavelength, the evanescent light is scattered by the apex of the sharpened core 51 so as to be propagated in the core. The light propagated in the core may be detected on the opposite side to the detection end for measuring the intensity of the evanescent field. The shape of the sample surface can be measured by finding the distribution of intensity of the evanescent field by scanning the sample surface. With this photon scanning tunneling microscope, the resolution is determined by the shape of the apex of the sharpened core 51, so that, by employing an optical probe 52 having the apex size of the sharpened core 51 shorter than the optical wavelength as described above, the resolution beyond the diffraction limit of a conventional optical microscope can be achieved.

The resolution of the photon scanning tunneling microscope is determined by the effective aperture diameter of the optical probe. On the other hand, the intensity of the evanescent field decreases exponentially with the distance from the sample surface. Consequently, the aperture diameter of the optical probe can be decreased by simply decreasing the apex size of its tip. Thus, for improving the resolution of the photon scanning tunneling microscope, it is critical to sharpen the tip of the optical probe.

Consequently, various methods have been tested for preparing an optical probe having a sharpened tip. An optical fiber is produced by a method consisting in sharpening an end of an optical fiber made up of a core doped with germanium dioxide and a clad.

However, since a clad diameter D (on the order of 90 $\mu$m) of a conventional optical fiber 52 of this type is significantly larger than the length L of a sharpened core 51 (on the order of 2 to 6 $\mu$m), a peripheral portion 52 of the clad tends to impinge on a sample 50 to damage the sample and/or the probe. Also, since the output of the evanescent light is extremely small, it is necessary with the optical fiber detecting the evanescent light (power) in order to avoid the effect by the scattered light and in order to raise the detection efficiency.

On the other hand, an optical coupling element optically coupling the light propagated in an optical fiber with an optical waveguide includes an optical fiber 60, a lens 61 and a optical waveguide 62, as shown in FIG. 3. With this optical coupling element, the light from a core 63 of the optical fiber 60 is collected using a lens 61 and caused to be incident on the optical waveguide 62.

Another optical coupling element has a semispherical protrusion 64 on the apex of a core 63 on one end of the optical fiber 60, as shown for example in FIG. 4. This optical coupling element is so constructed that the light propagated in the core 63 is collected by the protrusion 64 and caused to fall on the optical waveguide 62.

DISCLOSURE OF THE INVENTION

It is therefore an object of the present invention to provide an optical fiber in which the peripheral end of the clad is not liable to impinge on a sample surface and which is high in resolution and easy to manufacture.

It is another object of the present invention to provide a method for producing an optical fiber whereby the optical fiber achieving a high resolution can be made easily.

The present invention has been proposed for overcoming the above problems. An optical fiber for propagating the light according to the present invention includes a core for propagating the light and a clad for covering the core and confining the light propagated in the core. The optical fiber further includes a reduced-diameter portion at one end of the optical fiber obtained by reducing the diameter of the clad, a sharpened core at one end of the reduced-diameter portion, a pointed end obtained by sharpening the apex of the protrusion in a tapering fashion, a light confining coating layer made on the periphery of the protrusion in continuation to the clad, and an aperture smaller in size than the wavelength of light entering and exiting the core, made at the apex of the light-confining coating layer.

The optical fiber is used in a photon scanning tunneling microscope detecting the evanescent light localized in a smaller in size than the wavelength of light on the surface of an sample as an optical probe disposed in proximity to the surface of the sample for scattering the evanescent light for detecting the scattered light. The optical fiber is disposed so that the apex of the pointed end thereof is in proximity to the surface of the sample and scatters the evanescent light on the surface to guide the light to the core. The optical fiber has a small cone angle of the pointed end and a small diameter at the end portion (radius of curvature at the apex) and hence operates an optical probe having a high detecting efficiency.

A method for producing such optical fiber includes a first etching step etching an end of an optical fiber made up of a core and a clad with an etching solution composed of an aqueous solution of ammonium fluoride, hydrofluoric acid and water for reducing the diameter of the clad for producing a reduced-diameter portion and a second etching step for etching the apex of the reduced-diameter portion with an etching solution composed of an aqueous solution of ammonium fluoride, hydrofluoric acid and water for forming a protrusion of the core and for sharpening the apex of the protrusion in a tapering fashion for forming a pointed end. The core is made of quartz doped with germanium dioxide and propagates the light and the clad is made of quartz and covers the core for confining the light propagated in the core.

With the method for producing the optical fiber, an optical fiber, an optical fiber having high resolution may be produced easily.

Other objects, effects and more illustrative configurations of the present invention will become more apparent from the following description of illustrative embodiments.

BEST MODE FOR CARRYING OUT THE INVENTION

An optical fiber according to the present invention has a center core and a clad sheathing the core, and is formed as an elongated linear article.

The core is designed for propagating the light therein, while the clad is designed to confine the light propagated in the core.

Figure 1:
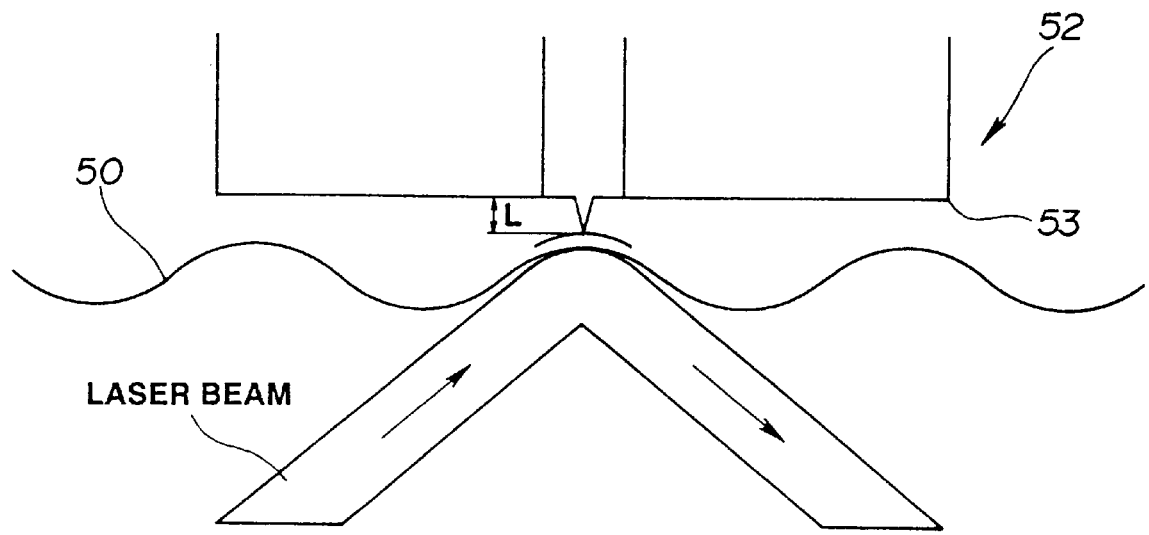
FIG. 1 schematically illustrates the principle of a photon scanning tunneling microscope.
Figure 2:
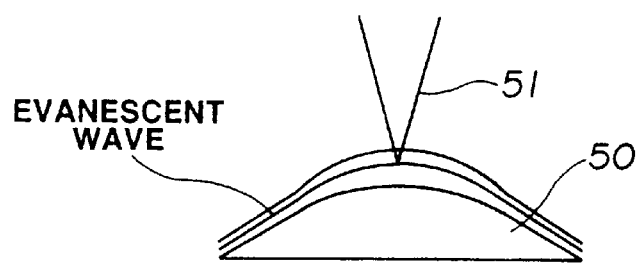
FIG. 2 illustrates the operation of detecting an evanescent wave of a photon scanning tunneling microscope shown in FIG. 1.
Figure 3:
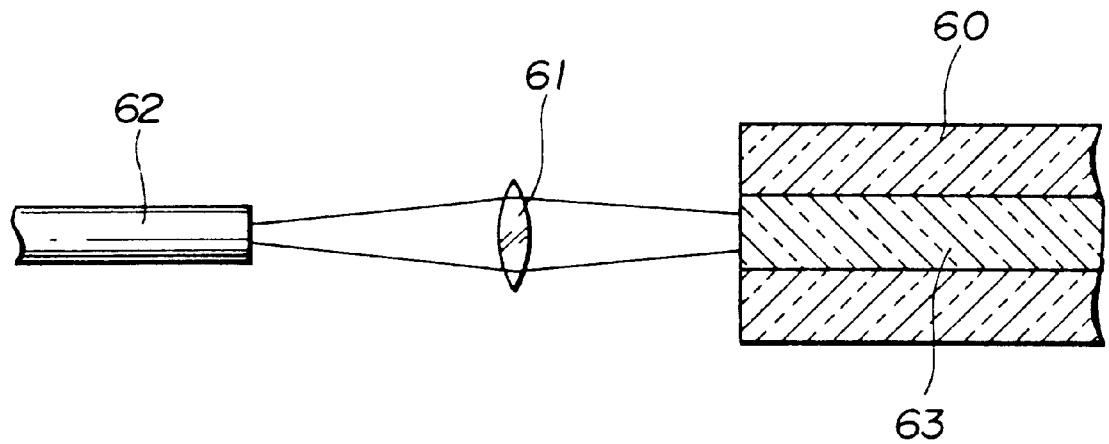
FIG. 3 illustrates the structure of a conventional optical coupling element.
Figure 4:
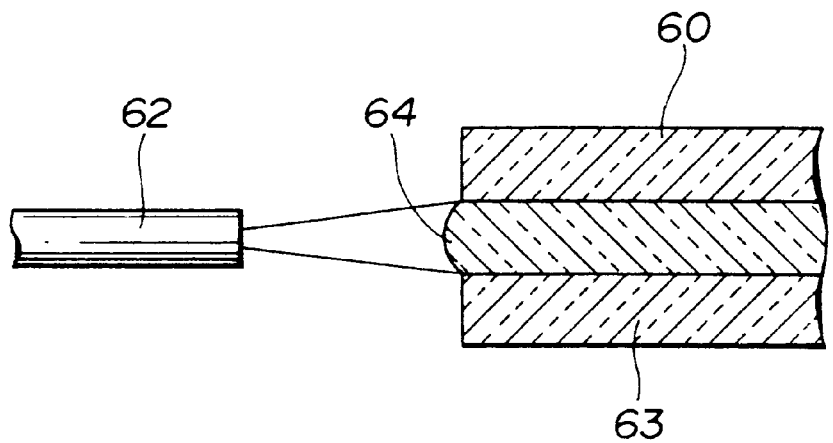
FIG. 4 illustrates the structure of another conventional optical coupling element.
Figure 5:
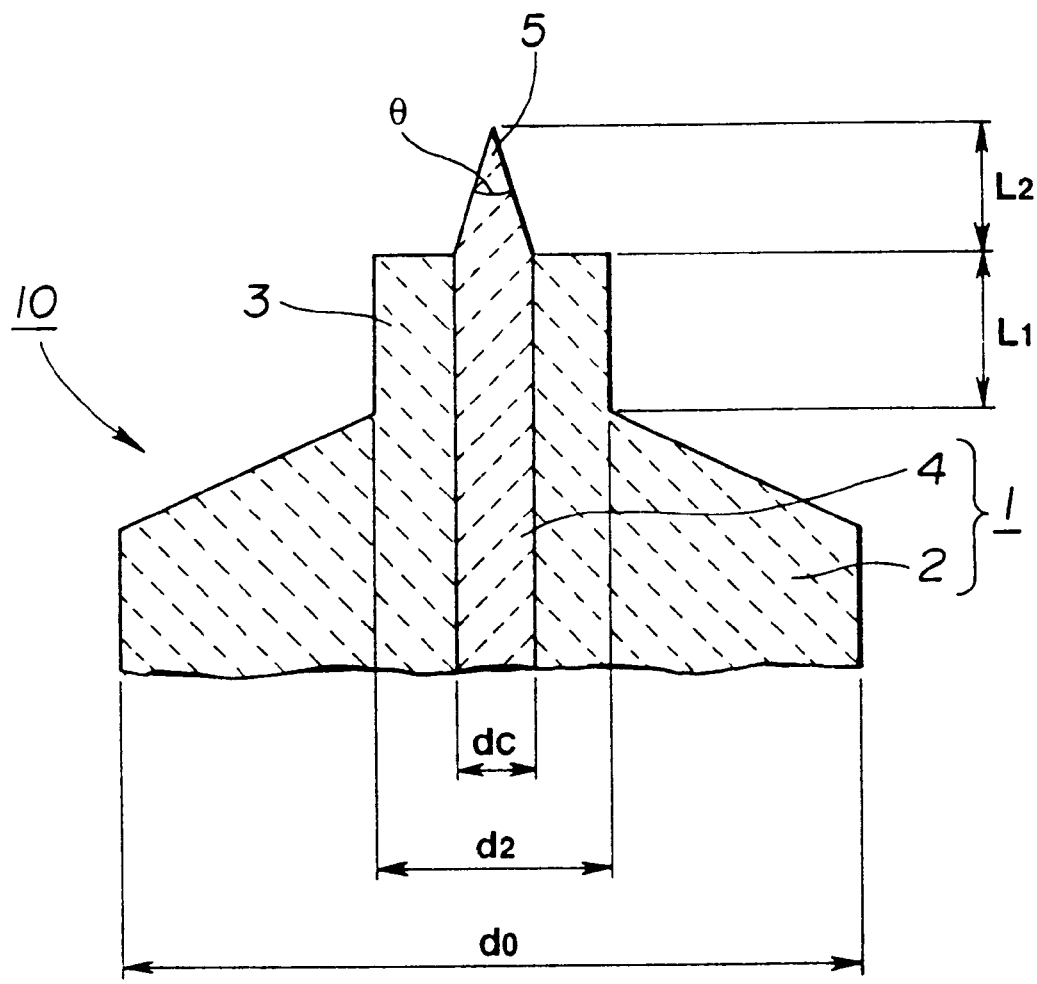
FIG. 5 illustrates the structure of an optical fiber according to a first embodiment of the present invention.

Referring to FIG. 5, an optical fiber of a first embodiment of the present invention is comprised of an optical fiber 1 having a clad diameter $d_0$ and a core diameter $d_c$. The optical fiber of the present invention has a reduced-diameter end portion 3 having a clad diameter $d_2$ of a portion of a clad 2 of a reduced thickness and has a sharpened core 5 having a cone angle θ obtained on sharpening the core 4 at the apex of the reduced-diameter portion 3.

This optical fiber 10 is used in a photon scanning tunneling microscope, designed for detecting the evanescent light localized in an area smaller than the wavelength of light on the surface of an sample, as an optical probe mounted in proximity to the sample for scattering and detecting the evanescent light.

The optical fiber 10 is used with an extreme end portion of the sharpened core 5 disposed in proximity to the surface of the sample. The sharpened core 5 scatters the evanescent light on the surface of the sample and guides it towards the core 4. The optical fiber 10 proves to be an optical probe of high efficiency because it has the sharpened core 5 with a small cone angle θ and a small diameter at the apex (small radius of curvature at the apex).

The optical fiber 10, having such structure, has the sharpened core 5, obtained on sharpening the core 4, at the apex of the reduced-diameter portion 3, representing a reduced-thickness portion of the clad 2. Thus the reduced-diameter portion 3 operates an extension substantially extending a length $L_2$ of the sharpened core 5 by its length $L_1$. Therefore, with the present optical fiber 10, the peripheral end of the clad 2 is not collided during use against a sample so that there is only little risk of fracturing the optical fiber 10 itself. Meanwhile, the reduced-diameter portion 3 sufficiently functions as a clad for the optical fiber 10 by setting the clad diameter $d_2$ so that $d_2 \geq 2d_c$.

Figure 6:
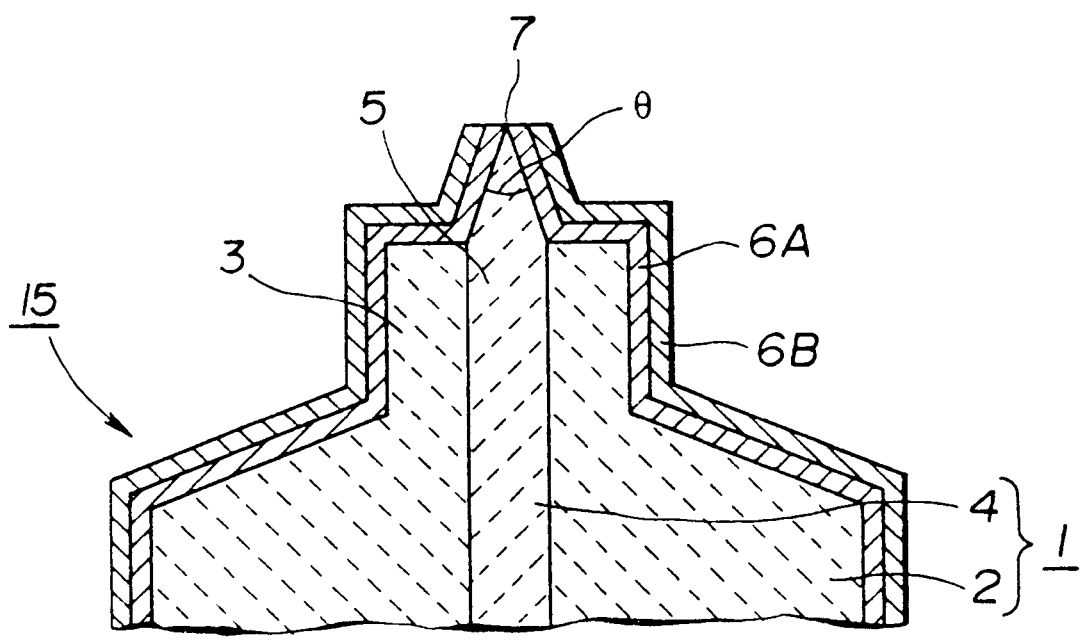
FIG. 6 illustrates the structure of an optical fiber according to a second embodiment of the present invention.

An optical fiber according to a second embodiment has, at the pointed end 5 of the optical fiber similar in shape to the first embodiment, a first coating layer 6A made of chromium and a second coating layer 6B made of gold, while also having a small-sized aperture 7 smaller than the wavelength of the detection light, as shown for example in FIG. 6.

Meanwhile, in an optical fiber for detecting the evanescent light in the photon scanning tunneling microscope, a light confining coating layer is desirably provided in an area except the pointed end for decreasing the effect of the scattered light for improving the detection efficiency. It is known that gold has high light confining properties and is not susceptible to oxidation. Moreover, gold can effectively control thermal radiation and decrease the effect of temperature fluctuations and hence is a sample highly promising as the coating layer.

However, gold is not susceptible to deposition on the quartz glass, so that, even if it is directly coated on the apex of an optical fiber, it is difficult to coat it uniformly to a thickness not less than 10 nm, such that it is presumed to be detached easily. For this reason, in the optical fiber of the present invention, the second coating layer 6B of gold is made uniformly and stably by providing the first coating layer 6A of chromium as described above.

Moreover, with the optical fiber 15, shaped as shown in FIG. 6, the coating layers 6A, 6B on the surface of the sharpened core 5 operates as the light confining portion so that the detection light having a wavelength close to the size of the aperture 7 can be selectively detected at the aperture 7 at the apex of the sharpened core 5. That is, since the diameter of the aperture 7 is less than the wavelength of the detection light, usual propagated light cannot enter the sharpened core 5, and only the evanescent light is scattered by the apex of the sharpened core 5 exposed at the aperture 7 so as to be scattered by the apex of the sharpened core 5 exposed at the aperture 7 to enter the core 4 via the sharpened core 5. Thus the effect of the scattered light may be decreased for raising the detection efficiency. For example, if the optical fiber is used as an optical probe for the above photon scanning tunneling microscope, the evanescent light having an extremely small power can be detected reliably.

Figure 7:
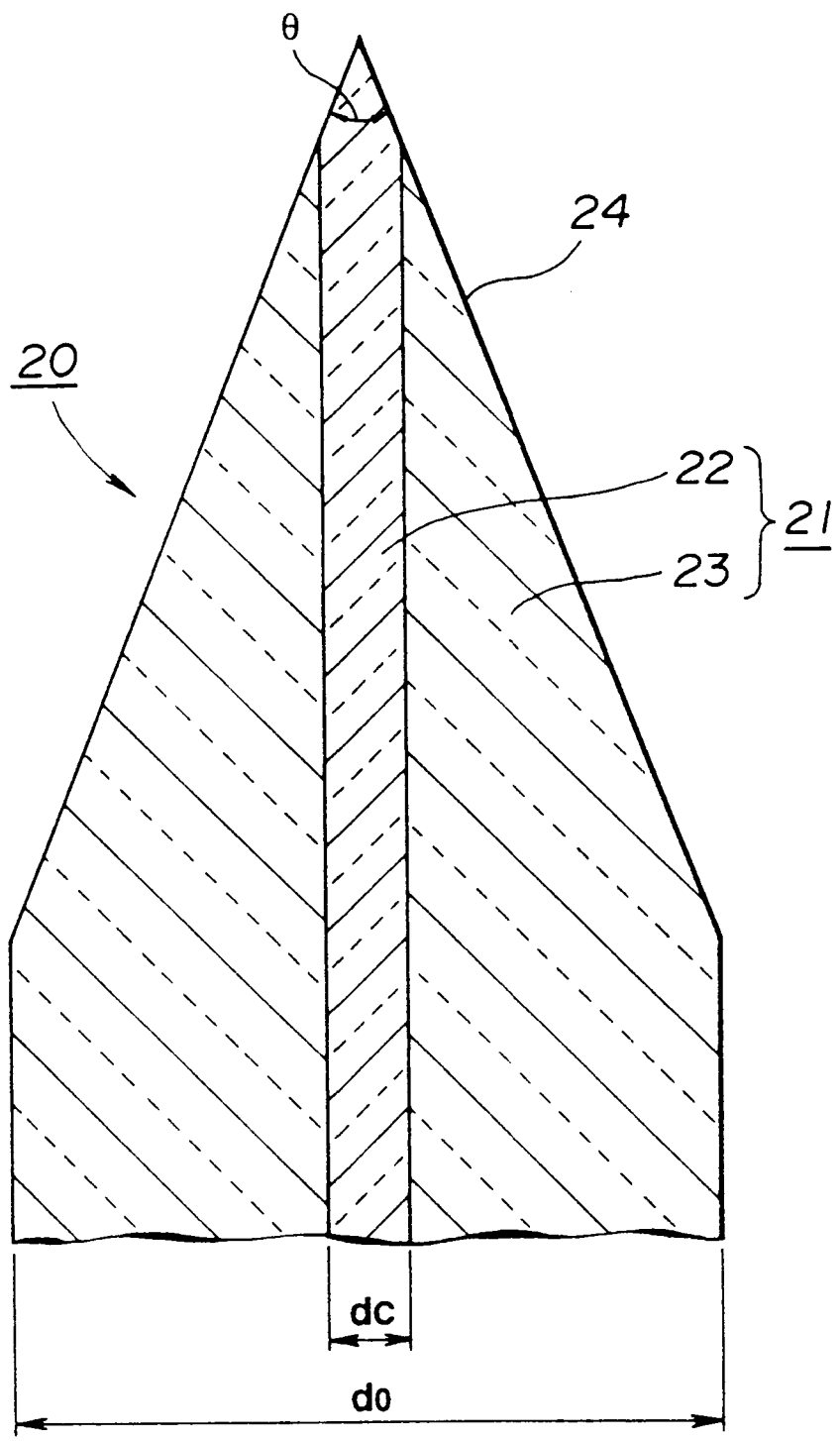
FIG. 7 illustrates the structure of an optical fiber according to a third embodiment of the present invention.

Moreover, with an optical fiber of a third embodiment of the invention, a pointed end 24 with an end angle θ obtained on conical sharpening beginning from the periphery of a clad 23 towards the center of the core 22 is provided at one end of an optical fiber 21 having the diameter $d_c$ of a core 22 and the diameter $d_0$ of a clad 23, as shown for example in FIG. 7. Specifically, the diameter $d_c$ of the core 22 is 3.4 μm, the diameter $d_0$ of the clad 23 is 12.5 μm, the end angle θ of the pointed end 24 is 25° and the radius of curvature at the apex of the pointed end 24 is 5 nm or less. The core 22 of the optical fiber 1 is made of quartz $SiO_2$ (glass)doped with germanium dioxide $GeO_2$, while the clad 3 is made of quartz $SiO_2$ (glass).

With the above structure of the optical fiber 15, similarly to the optical fiber 10 shown in FIG. 5, the optical fiber may be used as an optical probe for the photon scanning tunneling microscope. The apex of the pointed end 24 operates as a detector for detecting the evanescent light by scattering the evanescent light and guiding it in the core 22.

With the above shape of the optical fiber, since the pointed end is formed from the outer periphery of the clad 23 towards the center of the core 22, the peripheral portion of the clad is not collided against the sample surface, thereby safeguarding the sample surface of the optical fiber 20 itself against destruction, thus providing an optical fiber of high resolution.

Figure 8:
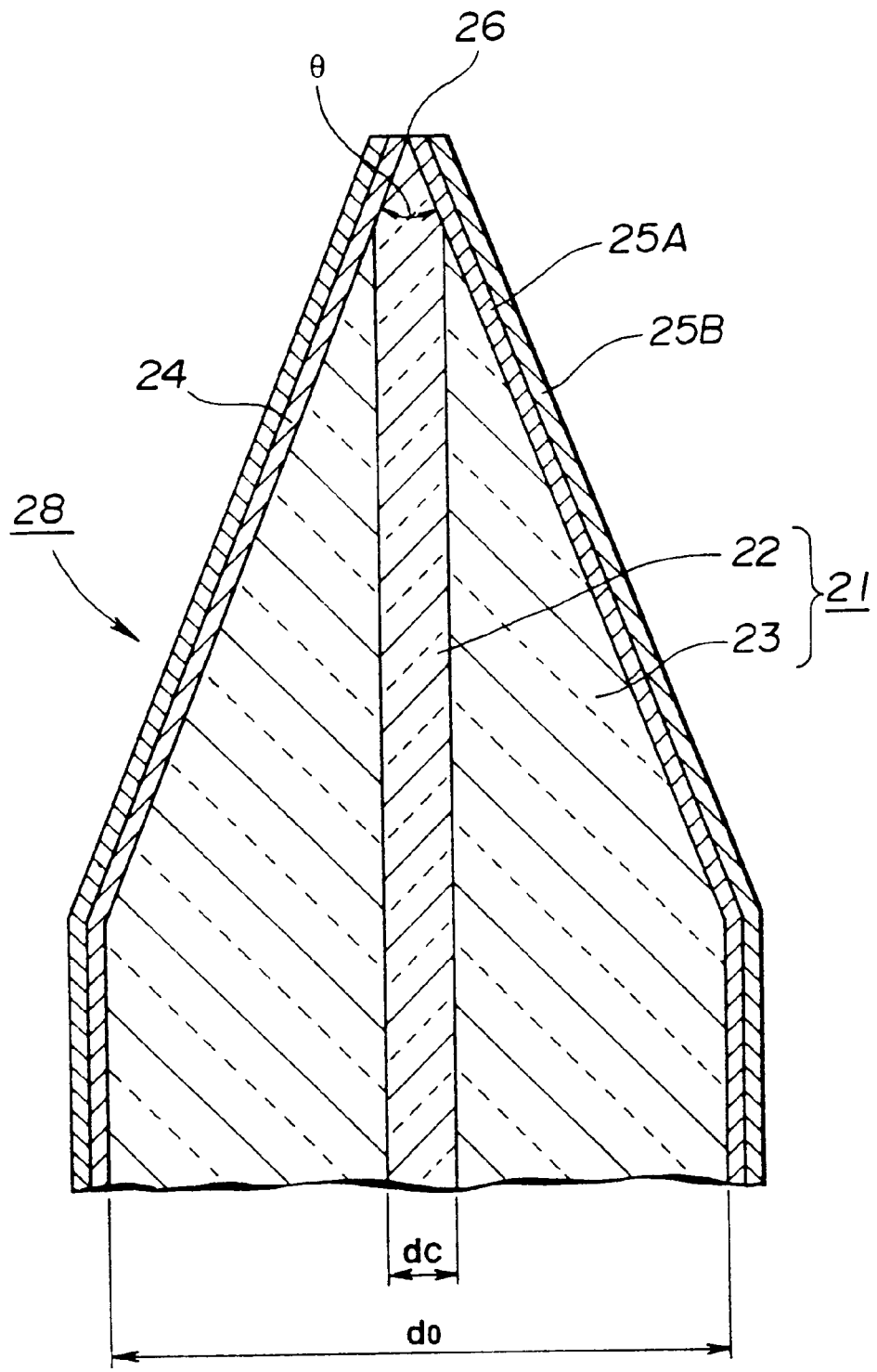
FIG. 8 illustrates the structure of an optical fiber according to a fourth embodiment of the present invention.

An optical fiber according to a fourth embodiment has, at the pointed end 24 of the optical fiber similar in shape to the third embodiment, a first coating layer 25A made of chromium and a second coating layer 25B made of gold, while also having a small-sized aperture 26 smaller than the wavelength of the detection light, as shown for example in FIG. 8. By providing the first coating layer 25A of chromium, the second coating layer 25B of gold is made uniformly and stably.

While the second coating layer 25B of the present fourth embodiment is made of gold, it may also be made of any suitable light confining sample, such as aluminum or silver. In addition, while the first coating layer 25A in the above embodiment is made of chromium, it is sufficient if the first coating layer 25A is of a sample which is readily affixed or deposited on quartz glass and to which is readily affixed or deposited a sample used for the second coating layer 5B.

With the optical fiber 28, having the above shape, the coating layer 25 on the surface of the pointed end 24 operates as a light confining portion. Therefore, if the optical fiber is used as an optical probe for the photon scanning tunneling microscope, the evanescent light is scattered only by the apex of the pointed end 24 exposed from the aperture 26 so as to be supplied to the core 22. In this manner, for raising the detection efficiency the detection light can be detected only at the aperture 26 formed at the apex of the pointed end 26 thus reducing the effect of the scattered light lowering the detection efficiency. Thus the evanescent light having an extremely small power can be detected reliably.

Figure 9:
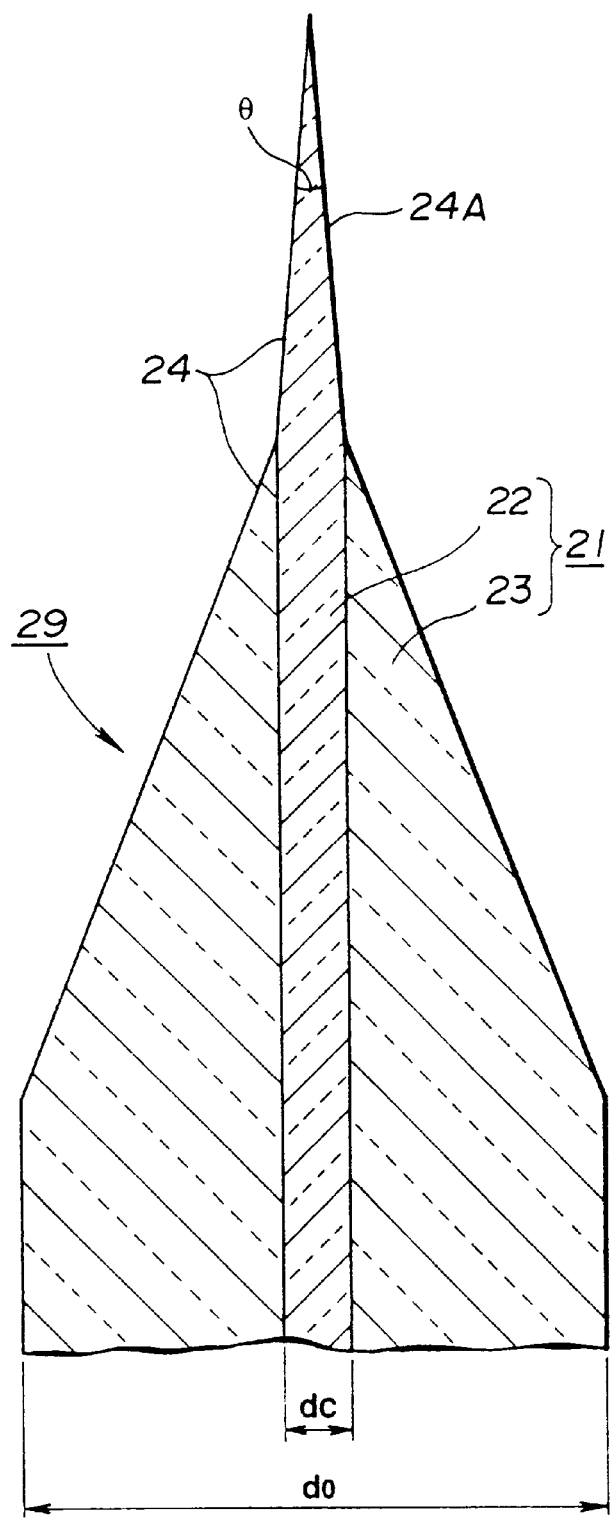
FIG. 9 illustrates the structure of an optical fiber according to a fifth embodiment of the present invention.

The optical fiber of the fifth embodiment of the present invention, a pointed end 24 obtained by conical sharpening from the outer periphery of the clad 23 is formed at an end of the optical fiber 21 having a diameter dof the core 22 and a diameter $d_0$ of the clad 23, as shown for example in FIG. 9. This optical fiber 29 has, at the apex of the core 22 at the apex of the pointed end 24, a pointed end 24A having a sharper angle than the angle of the clad at the pointed end 24.

As in the above-described third embodiment, the pointed end of this clad 23 is conically sharpened, so that, if the optical fiber 29 is used as an optical probe for the photon scanning tunneling microscope, the peripheral portion of the clad 23 is not collided against the sample surface, thus not destroying the sample or the optical fiber 29 itself.

In addition, since the cone angle of the pointed end 24A of the optical fiber 29 for the evanescent light is reduced for reducing the radius of curvature at the pointed end, it becomes possible to improve resolution.

Figure 10:
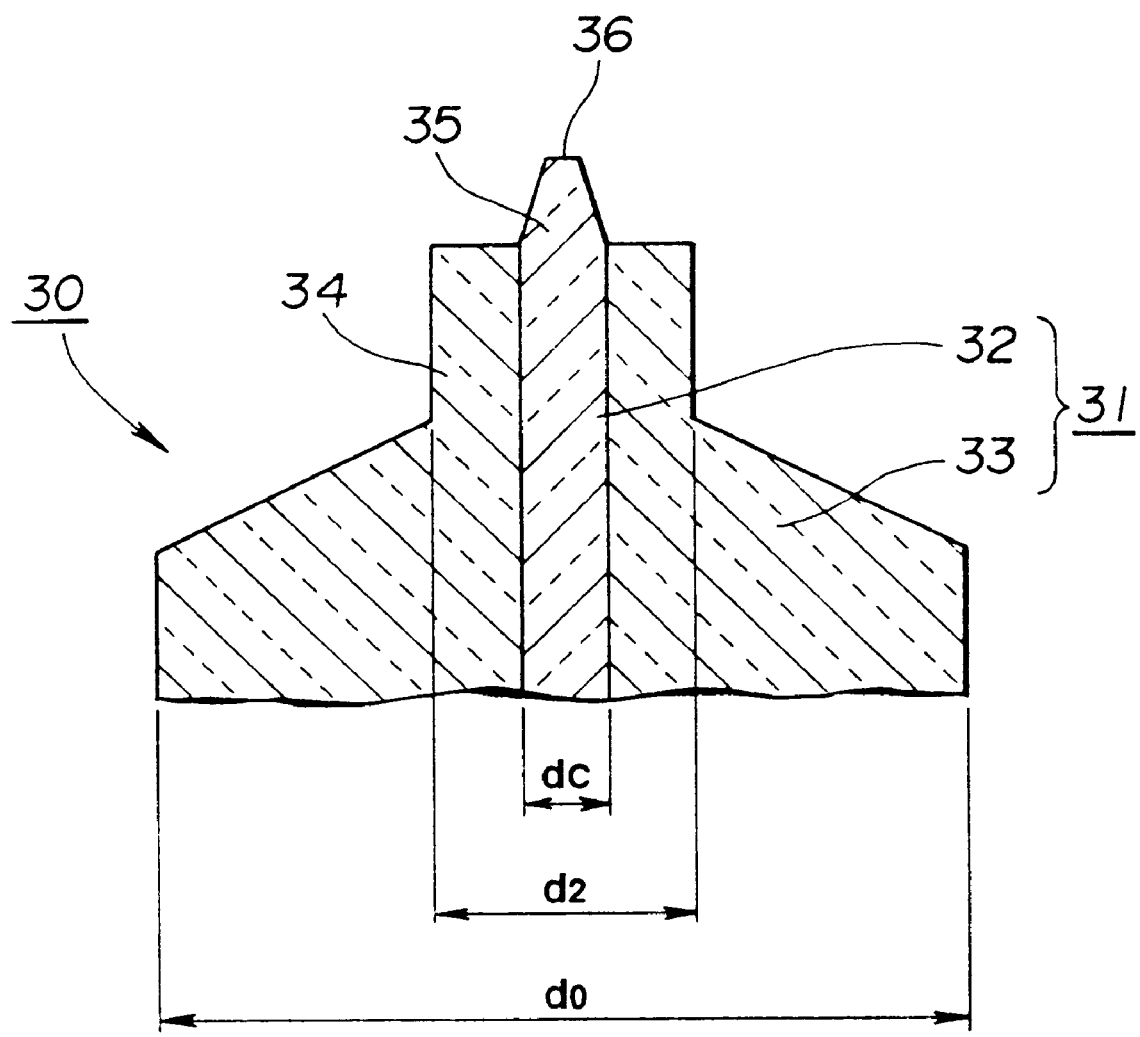
FIG. 10 illustrates the structure of an optical fiber according to a sixth embodiment of the present invention.

With an optical fiber according to a sixth embodiment of the present invention, one end of an optical fiber 31 made up of a core 32 and a clad 33 has a reduced-diameter portion 34, obtained on reducing the diameter of a portion of the clad 33, the apex of the reduced-diameter portion 34 has a sharpened core 35 obtained on sharpening the core 32 and the distal portion of the sharpened core 35 has a flat apex 36 of a small area, as shown for example in FIG. 10. The core 32 of the optical fiber 30 has a diameter $d_c$ equal to 3.4 μm, the clad 33 has a diameter $d_0$ equal to 125 μm, the reduced-diameter portion 34 has a diameter $d_2$ equal to 18 μm and the flat apex 36 has a diameter equal to 20 nm. The core 32 of the optical fiber 31 is made of quartz $SiO_2$ doped with germanium dioxide $GeO_2$, while the clad 33 is made of quartz $SiO_2$.

The optical fiber 30, having such shape, is used as an optical probe for the photon scanning tunneling microscope, while it is also used for entering the light propagated in the optical fiber 31 to an optical waveguide. In such case, the light propagated in the core 32 enters the optical waveguide only at the flat apex 36 via the sharpened core 35.

Figure 11:
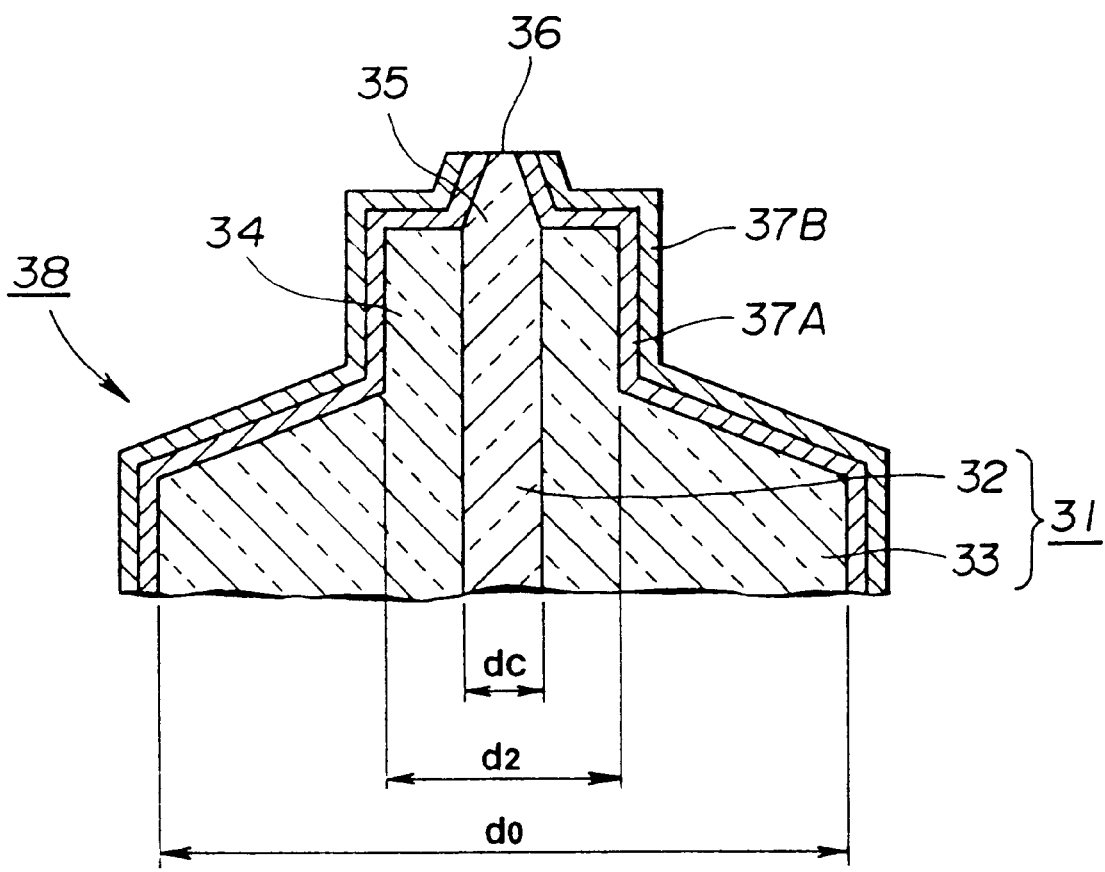
FIG. 11 illustrates the structure of an optical fiber according to a seventh embodiment of the present invention.

The optical fiber according to the seventh embodiment of the present invention has a light-confining coating layer on the surface of the protrusion 34 of the optical fiber similar in shape to the sixth embodiment. With the optical fiber, shown in FIG. 11, a reduced-diameter portion 34, obtained on reducing the diameter of a portion of the clad 33, is formed at an end of the optical fiber 31, made up of a core 32 and a clad 33, a sharpened core 35, obtained on sharpening the core 32, is formed at the apex of the reduced-diameter portion 34, a flat apex 36 of a reduced area is formed at the apex of the sharpened core 35, a first coating layer 37A of chromium and a second coating layer 37B of gold are provided at the sharpened core 35 and a flat apex 36 at the apex of the sharpened core 35 is formed as an aperture.

The optical fiber 38 of the above-described shape is used in, for example, the above-described photon scanning tunneling microscope, as an optical probe for detecting the evanescent light. The coating light 37 on the surface of the sharpened core 35 operates as a light confining portion for confining the scattered light and the apex of the flat apex 36 operates as a detection portion for scattering the evanescent light and guiding it in the core 32, so that the evanescent light can be detected without being affected by the scattered light, thus providing an optical fiber having a detection efficiency higher than in the conventional system.

While the second coating layer 7B of the present embodiment is made of gold, it may also be made of any suitable light confining sample, such as aluminum or silver. In addition, while the first coating layer 7A in the above embodiment is made of chromium, it is sufficient if the first coating layer 7A is of a sample which is readily affixed or deposited on quartz glass and to which is readily affixed or deposited a sample used for the second coating layer 7B.

Figure 12:
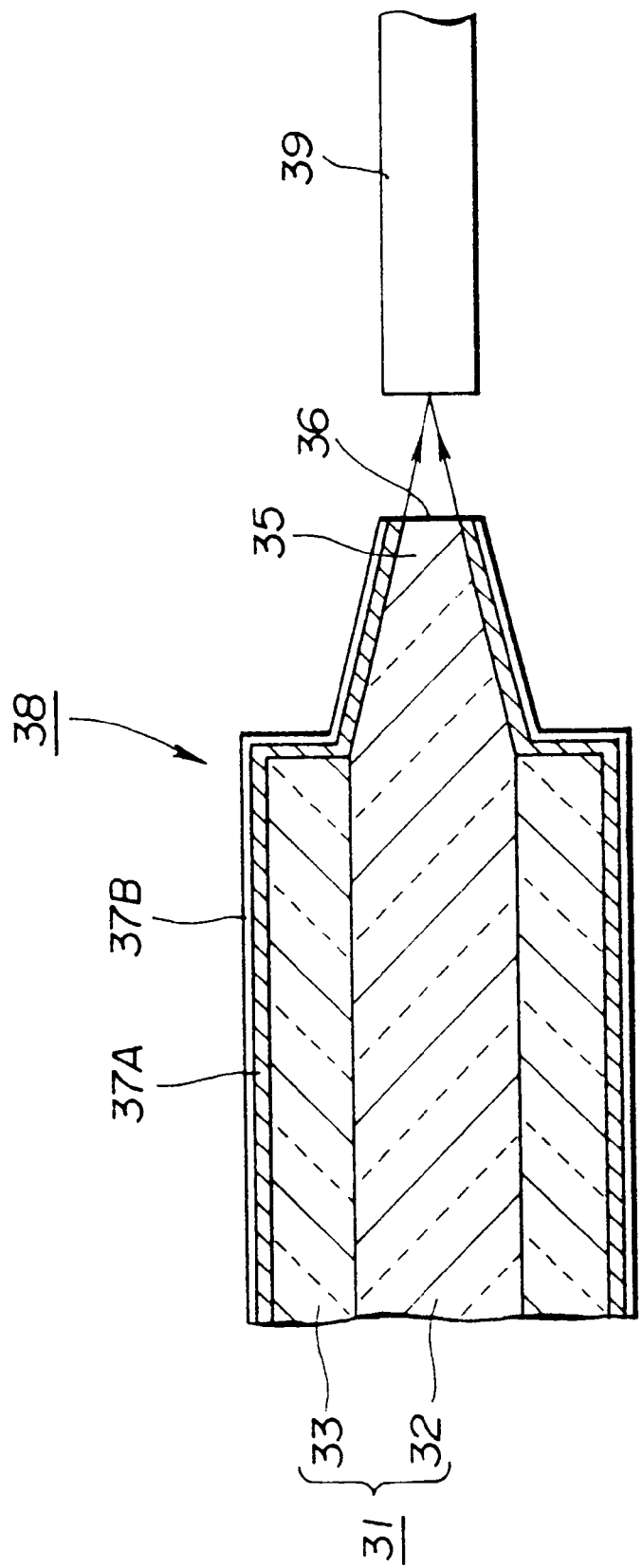
FIG. 12 illustrates the structure of an optical fiber according to an eighth embodiment of the present invention.

An optical coupling element of the eighth embodiment of the present invention has an optical fiber 38 similar to that of the seventh embodiment and an optical waveguide 39 in the form of a transparent planar plate, as shown for example in FIG. 12.

With the optical coupling element, the light propagated in the core 32 enters the optical waveguide 39 only via the sharpened core 35 and the aperture of the flat apex 36, so that the element operates as an optical coupling element having a high light coupling efficiency.

In addition, with the above-described optical fibers of the first to eighth embodiments, the evanescent light generated in the vicinity of the apex of the pointed end or near the aperture by the light incident on the core is radiated on, for example, an organic thin film, for functioning as a recording light source for high-density information recording on the organic thin film.

The method for producing an optical fiber according to a ninth embodiment of the present invention will now be explained.

The etching of an optical fiber is first explained.

If, with an optical fiber, made up of a core made of quartz $SiO_2$, doped with germanium dioxide $GeO_2$, and a clad made of quartz $SiO_2$, the end face of the fiber is soaked in a buffered hydrogen fluoride solution composed of a 40 wt % aqueous solution of ammonium fluoride and 50 wt % fluoric acid and water with a volumetric ratio of X:1:Y, where Y is arbitrary, the clad and the core are etched by a chemical reaction represented by:

$SiO_2$:

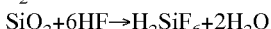
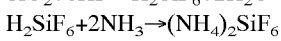

$GeO_2$:

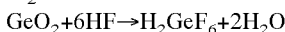
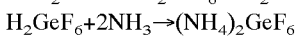

The core made of quartz doped with germanium dioxide $GeO_2$ and the clad made of quartz exhibits differential dissolution rates in the buffered hydrogen fluoride solution. This differential dissolution rates of the core and the clad are strongly correlated with the volumetric ratio X of ammonium fluoride. Although there is a slight variation depending on the liquid temperature, the dissolution rate of the core is substantially equal to that of the clad for X=1.5 to 1.7, whereas the dissolution rate of the core is faster for X<1.5 (or X<1.7) and the dissolution rate of the clad is faster for X>1.5 (or X>1.7). Consequently, by using the buffered hydrogen fluoride solution as an etching solution, the core and the clad can be etched selectively.

Meanwhile, the following samples A to E of the optical fibers, each having the clad diameter $d_0$ of 125 μm, a core diameter $d_c$ of 3.4 μm and having different rates of doping of germanium dioxide ($GeO_2$) in the core, such that:

sample A with $GeO_2$ doping rate in the core being 3.6 mol %;

sample B with $GeO_2$ doping rate in the core being 8.5 mol %;

sample C with $GeO_2$ doping rate in the core being 14 mol %;

sample D with $GeO_2$ doping rate in the core being 23 mol %;

sample E with $GeO_2$ doping rate in the core being 22 mol % and fluorine (F) doping rate in the clad being 2.1 mol %;

were processed for sharpening the cores, using an etching solution in which the volumetric ratio Y is set to 1 and the volumetric ratio X of ammonium fluoride $NH_4F$ is varied, for checking the relation between the cone angle θ of the core and the volumetric ratio X of ammonium fluoride $NH_4F$ in the etching solution. The results are shown in FIG. 13.

Figure 13:
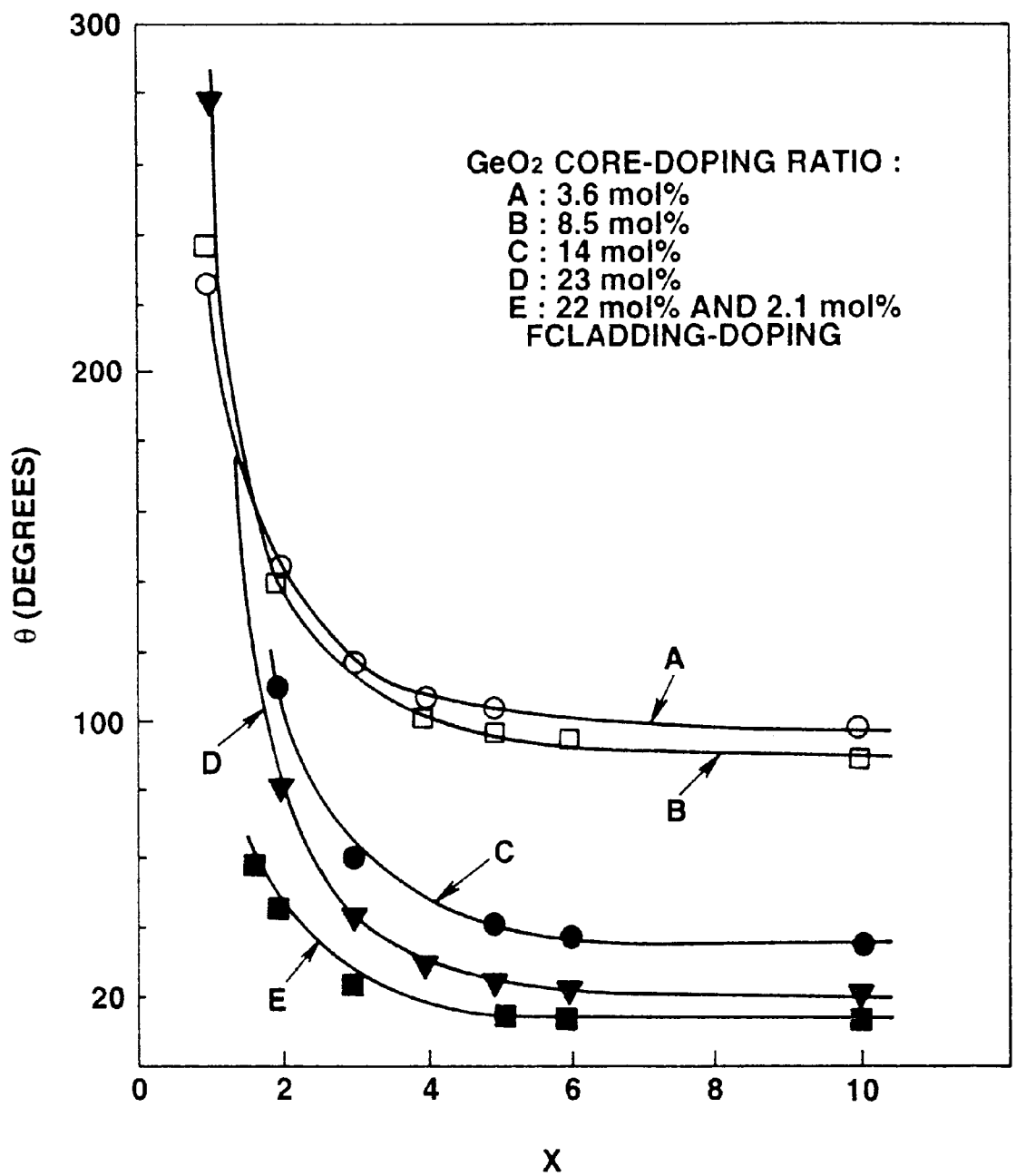
FIG. 13 is a graph showing the relation between a volume ratio X of ammonium fluoride $NH_4F$ in an etching liquid used for producing an optical fiber according to a ninth embodiment of the present invention and an angle θ of a sharpened end of a core of the optical fiber.

As may be seen from FIG. 13, the core may be sharpened to form a pointed end having a cone angle θ at the apex of the optical fiber by employing an etching solution with X:1:1.

That is, with the optical fibers of the samples A to D made of pure quartz clad, the dissolution rate of the core becomes substantially equal to that of the clad substantially for X=1.5 to 1.7. Therefore, the etching solution with X>1.5 (or 1.7) may be used for sharpening the core. On the other hand, with an optical fiber of the sample E having the clad made of quartz doped with fluorine, the dissolution rate of the clad is faster than that for the clad of pure quartz, with the two rates becoming equal for substantially X−1. Therefore, sharpening can be carried out using an etching solution with X>1. With the optical fiber of the sample E, the pointed end with the cone angle θ of 14° by carrying out the sharpening with the etching solution with X=5. This cone angle is a cone angle θ smaller than in the case of the pure quarts clad fiber.

Moreover, the reduced-diameter portion having the reduced clad can be formed at one end of an optical fiber by carrying out etching employing an etching solution having a low volumetric ratio X of ammonium fluoride $NH_4F$ for which the dissolution rates for the clad and the core become equal to each other.

If the etching solution having a low volumetric ratio of ammonium fluoride $NH_4F$ is used, the clad of the optical fiber can be selectively etched for forming a reduced-diameter portion having a reduced clad diameter at an end of the optical fiber.

Meanwhile, it has been experimentally shown that, since use of an etching solution having the volumetric ratio X of ammonium fluoride $NH_4F$ smaller than a certain value leads to a recessed apex of the optical fiber and to shortened etching time, an etching solution with X=1.5 to 1.8 is most preferred in order to form the reduced-diameter portion at an end of the optical fiber. By adjusting the etching time, a reduced-diameter portion with a clad diameter $d_1$, reduced to ⅓ of the diameter $d_0$ of the original clad, could be formed.

If the value of the volumetric ratio of ammonium fluoride $NH_4F$ is larger than a pre-set value, the etching time is protracted, such that the etching cannot be completed within a practically acceptable time. The value of X not larger than 30 is preferred for the proper etching time.

Figure 14:
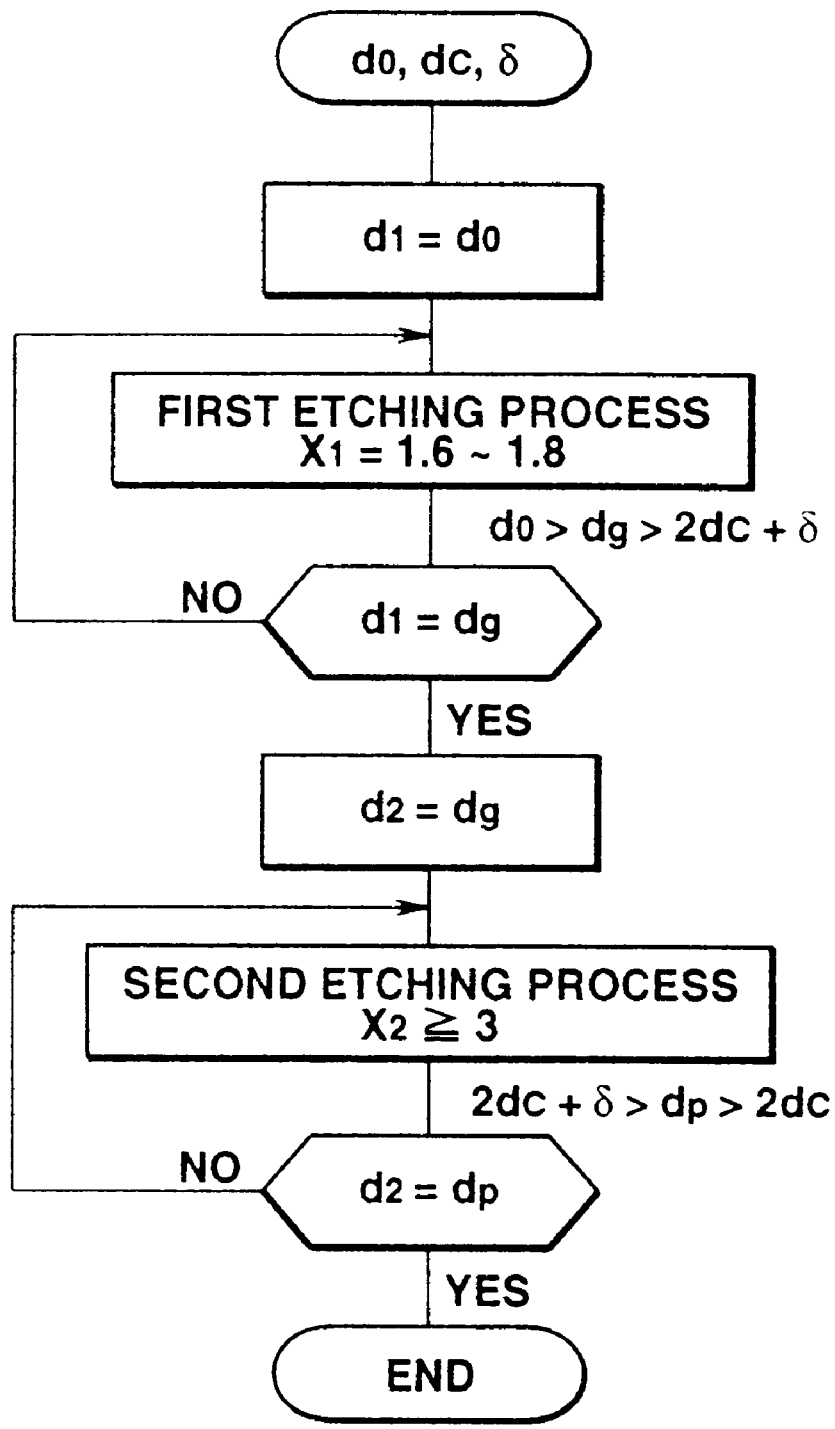
FIG. 14 is a flowchart showing an operational sequence of an optical fiber in a method for producing the optical fiber of the ninth embodiment.

The method for producing the optical fiber is explained by referring to FIGS. 14 and 15.

In the present method for producing the optical fiber, an optical fiber having the shape as shown in FIG. 5 is prepared, using an optical fiber having a clad diameter $d_0$ and a core diameter $d_c$ as a starting sample, in accordance with a processing sequence shown in a flowchart of FIG. 14.

In the present method for preparing the optical fiber, the starting sample is etched in a first etching step using, as an etching solution, a buffered hydrogen fluoride solution having the volumetric ratio X for ammonium fluoride $NH_4F$ set so as to be substantially equal to a value producing the substantially equal core and clad dissolution rates, for forming a reduced-diameter portion 3 at an end of an optical fiber 1. The resulting sample is etched in a second etching step using, as an etching solution, a buffered hydrogen fluoride solution having the volumetric ratio X of ammonium fluoride $NH_4F$ set so as to be larger than a value corresponding to the substantially equal core and clad dissolution rates, for forming a sharpened core 5 which is a sharpened apex of the reduced-diameter portion 3.

Figure 15A:
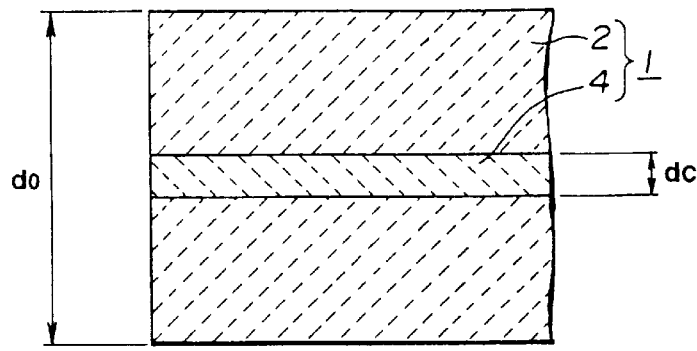
FIGS. 15A–15D are a cross-sectional view of an optical fiber in each step in the method for producing an optical fiber according to the ninth embodiment.
Figure 15B:
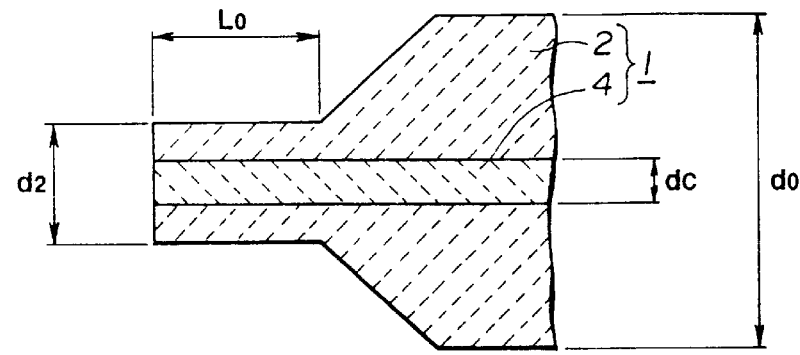

That is, in the first etching step, the optical fiber 1 having the clad diameter $d_0$ and the core diameter $d_c$ as shown in FIG. 15A was etched, using an etching solution with X substantially equal to a value for which the core dissolution rate is substantially equal to the clad dissolution rate so that the clad diameter $d_1$ at one end thereof is $d_1=d_0$. Beginning from the state in which the clad diameter $d_1=d_0$, etching is done until the required value for the first etching step $d_g$ ($d_0 > d_g > 2d_c + \delta$) is reached, in order to form a reduced-diameter portion 3 with a clad diameter $d_1=d_g$ and a length $L_0$, as shown in FIG. 15B.

Figure 15C:
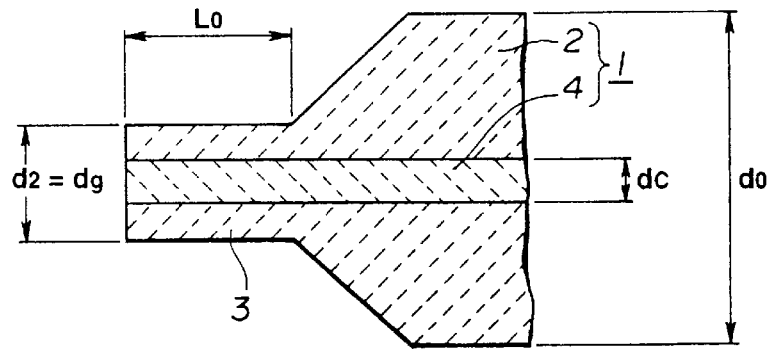
Figure 15D:
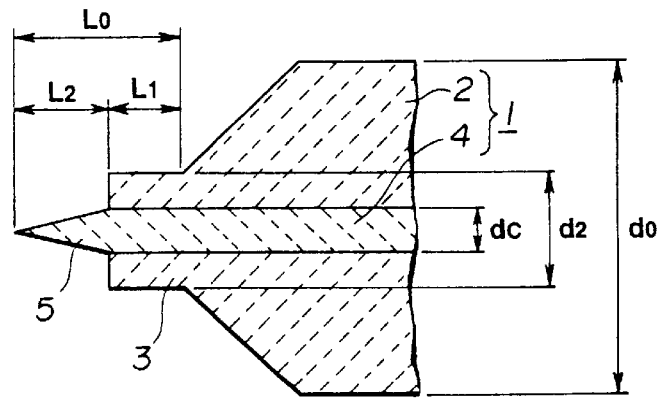

In the second etching step, the optical fiber 1 having the clad diameter $d_0$ and the core diameter $d_c$ as shown in FIG. 15C was etched, using an etching solution with X set so as to be larger than a value corresponding to the substantially equal core and clad dissolution rates, so that the clad diameter $d_2$ at the reduced-diameter portion 3 is $d_2=d_g$. Beginning from the state in which the clad diameter $d_2=d_g$, etching is done until the required value $d_p$ for the second etching step $d_p$ ($2d_c + \delta > d_p > 2d_c$) is reached, in order to form a sharpened core 5 having a length $L_2$ and a cone angle $\theta$ at the apex of the reduced-diameter portion 3 having the clad diameter $d_2=d_p$, as shown in FIG. 15D.

Meanwhile, $\delta$ is the reduced clad diameter obtained on forming the sharpened core 5, having a length $L_2$ and a cone angle $\theta$, at an end part of the optical fiber 1 having the clad diameter $d_0$ and the core diameter $d_c$, by one etching operation using an etching solution with X set so as to be larger than the value corresponding to the substantially equal core and clad dissolution rates. The volumetric ratio X of ammonium fluoride $NH_4F$ of the etching solution used in the first etching solution, and the etching time, were found by previous experiments from the cone angle $\theta$ of the sharpened core 5, in order to find the diameter $\delta$ and in order to set the required values $d_g$ and $d_p$ and the volumetric ratio X for ammonium fluoride $NH_4F$ in the etching solution employed for the first etching step and the etching time $t_1$.

The optical fiber of the example E, with the $GeO_2$ doping ratio in the core of 22 mol % and the doping ratio of fluorine (F) in the clad of 2.1 mol %, was etched for 40 minutes with an etching solution with X=1 in the first etching step, and further etched for 40 minutes with an etching solution with X=5 in the second etching step. In this manner, an optical fiber having the clad diameter $d_2$ of the reduced-diameter portion 3 reduced to 24 μm could be prepared from the starting optical fiber with the clad diameter $d_2$ of 125 μm.

On the other hand, the optical fiber of the sample E was etched for 60 minutes by the conventional method for production, using an etching solution with X=5, for sharpening the core to produce an optical fiber having a clad diameter $d_2$ of 88 μm.

The optical fiber of the sample A, with the doping ratio of 3.6 mol % of $GeO_2$ in the core, was etched in the first etching step for 60 minutes, using an etching solution with X=1.7, and subsequently etched in the second etching step using the etching solutions with X=3, 4 and 20, in order to check the relation between the clad diameter $d_2$ of the reduced-diameter portion 3 and the etching time $t_2$ for the second etching step. The results are shown in FIG. 16.

Figure 16:
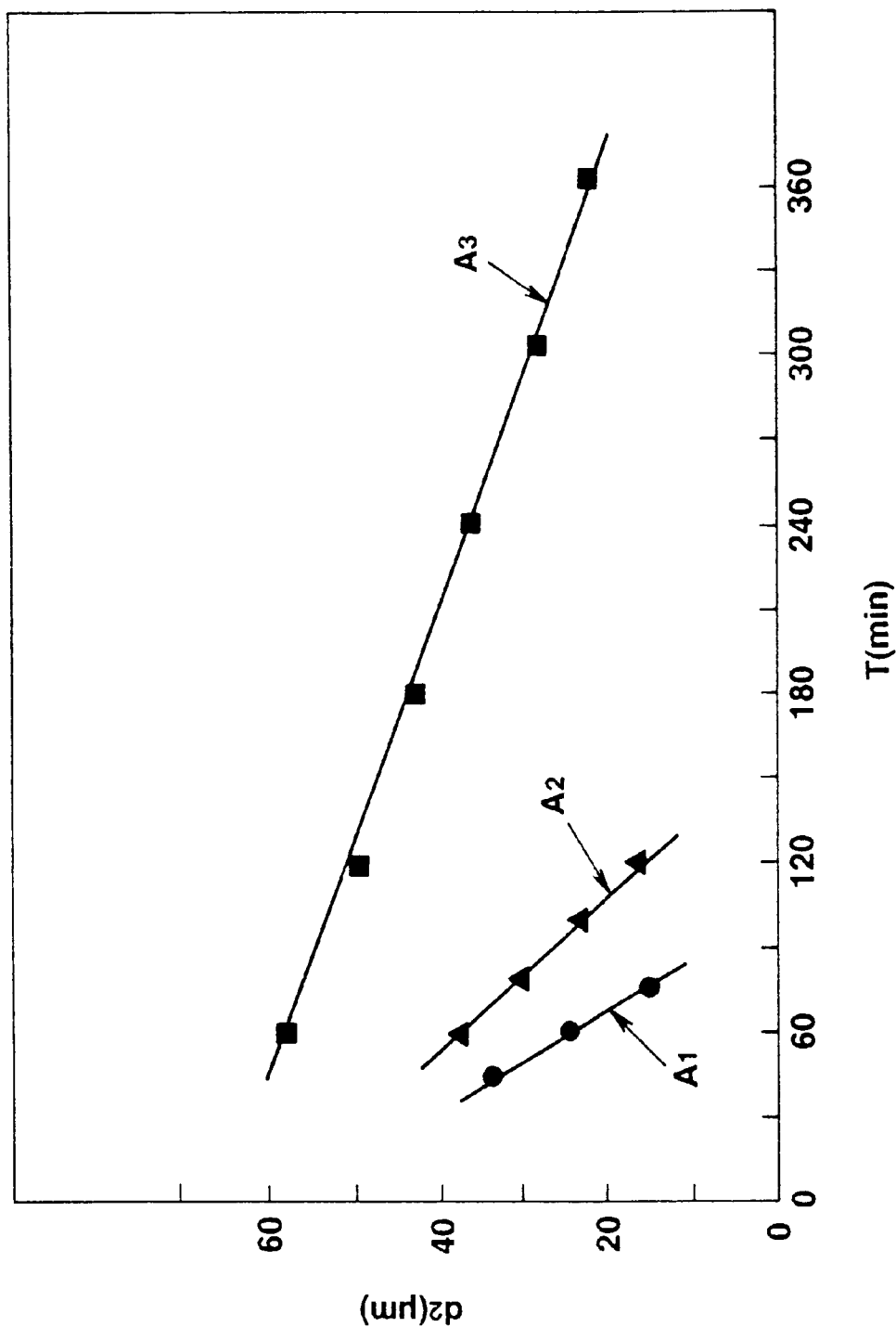
FIG. 16 is a graph showing the relation between the etching time in the second etching step in the method for producing an optical fiber of the ninth embodiment and the clad diameter of the reduced diameter portion.

In FIG. 16, a line segment $A_1$ shows the results of etching with an etching solution of X=3 in the second etching step, while a line segment $A_2$ shows the results of etching with an etching solution of X=4 in the second etching step. A line segment $A_3$ shows the results of etching with an etching solution of X=20 in the second etching step.

The difference $\Delta\theta = \theta_1 - \theta_2$, wherein $\theta_1$ and $\theta_2$ denote the cone angles, was then checked. The cone angle $\theta_1$ is the cone angle obtained on sharpening the core by one etching using an etching solution having a volumetric ratio X on each of the optical fiber of the sample A with the $GeO_2$ doping ratio in the core of 3.6 mol %, the optical fiber of the sample D with the $GeO_2$ doping ratio in the core of 23 mol % and the optical fiber of the sample E with the $GeO_2$ doping ratio in the core of 22 mol % and with fluorine F doping ratio in the clad of 2.1 mol %. The cone angle $\theta_2$ is the cone angle obtained on sharpening the core by the second etching step using the same etching solution. The results are shown in FIG. 17, wherein the values 14 to 124 denote the dependence of the cone angle $\theta$ in the respective measurements.

Figure 17:
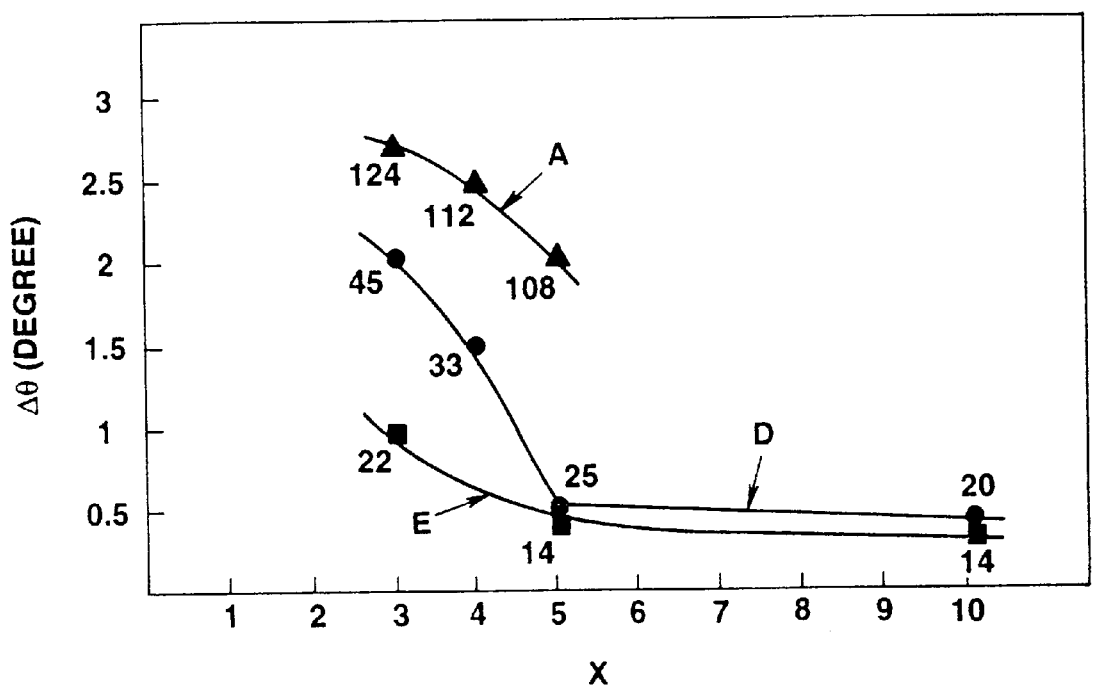
FIG. 17 is a graph showing the difference Δθ between an angle $θ_1$ of an end of a core sharpened for a first etching employing an etching liquid having a volumetric ratio of ammonium fluoride $NH_4H$ of X and an angle $θ_2$ of an end of a core sharpened in the course of the second etching step in the method for producing an optical fiber of the present invention in the second etching step.

As may be seen from FIGS. 16 and 17, the clad diameter $d_2$ of the reduced-diameter portion 3 could be refined up to ⅕ of the original clad diameter $d_0$ while the cone angle $\theta$ of the sharpened core 5 was maintained. Moreover, the cone angle difference $\Delta\theta$ could be maintained at 0.5° or less.

In the method for producing an optical fiber according to a tenth embodiment of the present invention, an optical fiber having a shape shown in FIG. 7 is prepared, by a processing sequence shown in FIGS. 18A–18E, using an optical fiber having a clad diameter $d_0$ and a core diameter $d_c$ as a starting sample.

In the following description, the optical fiber is of a clad diameter $d_0$ of 125 μm and a core diameter $d_c$ of 3.4 μm and has a higher value of 25 mol % of the doping ratio of germanium dioxide $GeO_2$ in the core.

Figure 18A:
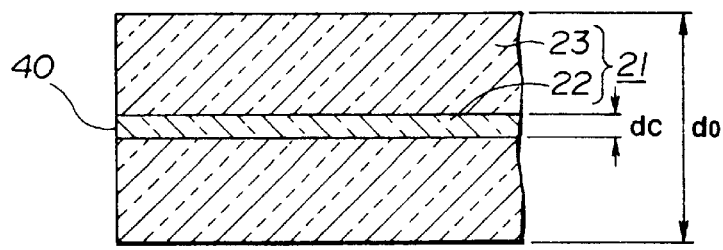
FIGS. 18A–18E are a cross-sectional view of an optical fiber in each step in the method for producing an optical fiber according to the tenth embodiment.
Figure 18B:
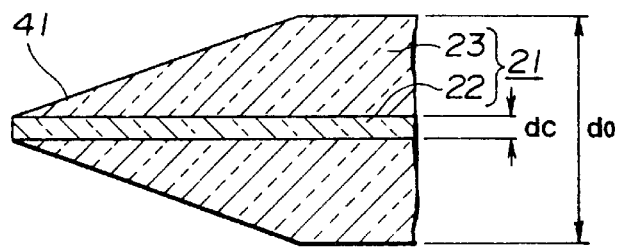

With the present method for preparing the optical fiber, an end 40 of the optical fiber 21 shown in FIG. 18A is etched in the first etching step with an interface of hydrofluoric acid and a liquid lower in specific gravity than hydrofluoric acid, such as spindle oil or silicon oil, for e.g., 25 to 30 minutes, for forming a tapered portion 41 in the clad 23, as shown for example in FIG. 18B.

Figure 18C:
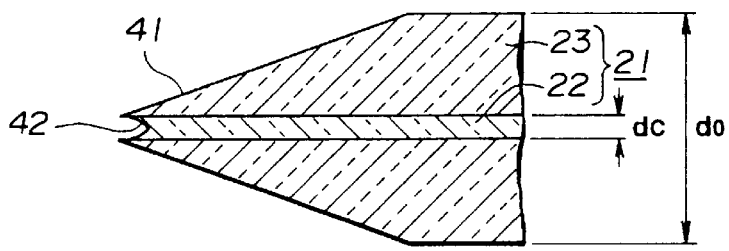

In the second etching step, the tapered portion 41 is etched with hydrofluoric acid for e.g., two to three minutes, for forming a recess 42 in the core 22 receded from the end face of the tapered portion 41 of the clad 23, as shown in FIG. 18C.

Figure 18D:
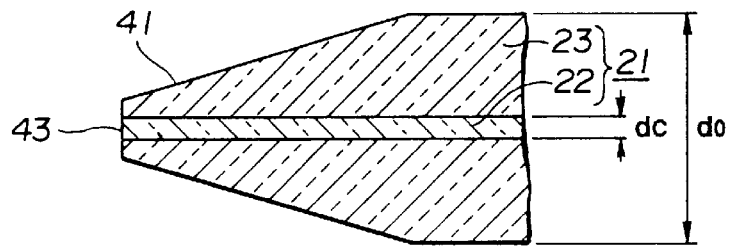

In the third etching step, the tapered portion 41 is etched, using an etching solution consisting of a buffered hydrogen fluoride solution with a volumetric ratio of ammonium fluoride $NH_4F$ of 1.5 to 1.7 and volumetric ratio of water of 1, or with the volumetric ratio of 5:1:10, for e.g., 30 to 50 minutes (for e.g., 60 to 90 minutes if the etching solution has the volumetric ratio of 5:1:10) for forming a planar portion 43, in which the apex of the core 22 is flush with the apex of the tapered portion 41, as shown for example in FIG. 18D.

Figure 18E:
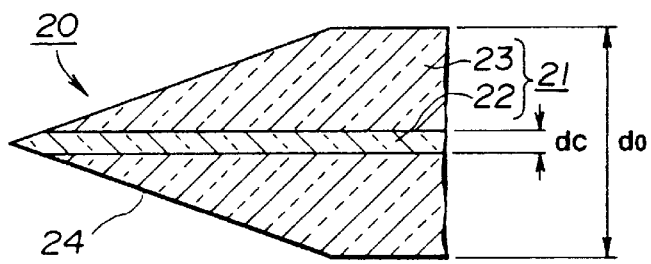

In the fourth etching step, the tapered portion 41 is etched, using an etching solution composed of a buffered hydrogen fluoride solution with a volumetric ratio X=5 of ammonium fluoride $NH_4F$, for example, for e.g., 60 to 90 minutes, for forming a conically sharpened pointed end 24 from the outer periphery of the clad 23 to the center of the core 22, as shown for example in FIG. 18E. This completes an optical fiber shaped as shown for example in FIG. 7.

The above-described first etching step is explained in detail. In the vicinity of an interface between hydrofluoric acid and the spindle oil or silicon oil, a meniscus of hydrofluoric acid is made around the optical fiber, and the height of the meniscus is changed, so that the conically-shaped tapered surface is formed.

If the end 40 of the optical fiber 21 is etched on the hydrofluoric acid interface, the clad 23 is reduced in diameter in hydrofluoric acid in which no meniscus is formed, while the cylindrical shape of the optical fiber 21 is maintained. If etching is continued until the cylindrical portion is dissolved, the conically-shaped tapered portion 41 is formed at one end of the optical fiber 21, as explained previously.

In effect, the hydrofluoric acid vapor is present in the vicinity of the interface. This vapor etches the optical fiber 21. Therefore, in the present tenth embodiment, the etching of the first etching step is performed in the interface between hydrofluoric acid and the spindle oil or silicon oil.

Moreover, with the present optical fiber 21, the doping ratio of germanium dioxide $GeO_2$ in the core 22 is as high as 25 mol %, so that the etching rate for the core 22 in hydrofluoric acid is significantly higher than that for the clad 23.

In the above-described first etching step, the etching is performed in the interface between hydrofluoric acid and the spindle or silicone oil, so that the tapered portion 41 is formed, as explained previously. After the portion of the clad 23 beyond the tapered portion 41 is etched completely, the portion of the core 22 beyond the tapered portion 41 is etched. In the second etching step, in which etching is done in hydrofluoric acid, the portion of the core 22 at the apex of the tapered portion 41 is first etched for forming a recess 42 receded from the apex of the clad 23 of the tapered portion 41 is formed in the core 22.

In the third etching step, the clad 23 needs to be etched selectively for forming a planar portion 43 flush with the recess 42 at the apex of the clad 23 of the tapered portion 41. Thus the etching is performed using an etching solution having a volumetric ratio X=1.5 to 1.7 of ammonium fluoride $NH_4F$ and the volumetric ratio Y=1 of water whereby the clad 23 may be etched with a larger etching rate than the core 22.

Meanwhile, if the etching is performed for this third etching step using an etching solution having a volumetric ratio of 5:1:10, the rate of decrease of the clad diameter by the third etching step can be lowered because of the lower etching rate for the clad 23.

Since the etching rate of the core 22 depends on the amount of distribution of germanium dioxide $GeO_2$, the etching rate is high in the etching solution of X=5 used in the fourth etching step because of the larger doping ratio of germanium dioxide $GeO_2$ in the core 22 region, while the etching rate is low around the core 22 where the doping ratio of germanium dioxide $GeO_2$ is small. The result is that a conically sharpened pointed end 24 is formed from the outer periphery of the clad 23 towards the center of the core 22 in the fourth step.

The end angle θ of the pointed end 24 formed in the fourth etching step depends on the distribution of germanium dioxide $GeO_2$ in the core 22 and the volumetric ratio X of ammonium fluoride $NH_4F$ in the etching solution. Thus the etching is performed in the fourth etching step using an etching solution with the volumetric ratio X=5 of ammonium fluoride $NH_4$ F for obtaining the end angle of, for example, 25°.

In this manner, the optical fiber 20 having a structure shown in FIG. 7 is formed. The result is that, with the present method for producing the optical fiber, the shape of the pointed end 24 is determined in dependence upon the distribution of germanium dioxide $GeO_2$, so that the it becomes possible to form the conical shape high in reproducibility and excellent in symmetry.

If the optical fiber 20 is used in, for example, the above-described photon scanning tunneling microscope as an optical probe for detecting the evanescent light, it operates as an optical probe with high resolution, with the peripheral portion of the clad not impinging on the sample surface.

In the above-described tenth embodiment, etching for the first etching step was carried out in the interface between hydrofluoric acid and the spindle oil or the silicon oil. However, the tapered portion 41 can similarly be formed by carrying out the etching in the interface between the etching solution having the above volumetric ratio of 1:1:10 and the spindle oil or the silicon oil.

In such case, if the etching is performed for e.g., 20 to 40 minutes with the temperature of the etching solution of 60° C. to 90° C., the etching effect comparable to that in case of using hydrofluoric acid may be achieved. That is, not only can the etching rate similar to that in case of using hyudrofluoric acid be obtained, but also the surface of the tapered portion 41 becomes smooth, with the etching not being obstructed by impurities, such as silicon oil.

It is also possible to perform etching for adjusting fluctuations in the end angle and shape of the tapered portion 41 between the first etching step and the second etching step. The result is that, even if the tapered portion 41 formed by the first etching step is fluctuated in shape, it is possible to provide an optical fiber having an uniform ultimate shape.

In addition, in the first etching step, described above, the etching may be terminated before complete dissolution of the core 22 and the clad 23 at the apex of the tapered portion 41 so that a reduced-diameter portion of the clad, not shown, is left at the apex of the tapered portion 41. The second and third etching steps may be replaced by a breaking step in which the reduced-diameter portion is broken, after which the etching of the fourth etching step is performed for forming the conical pointed end 24 described above.

In the method for producing the optical fiber according to the eleventh embodiment of the present invention, an optical fiber having the shape as shown in FIG. 7 is formed by a sequence of operations shown in FIGS. 18A–18E, using an optical fiber having a clad diameter $d_0$ and a core diameter $d_c$, after which a light-confining coating layer shown in FIG. 8 is formed.

Figure 19:
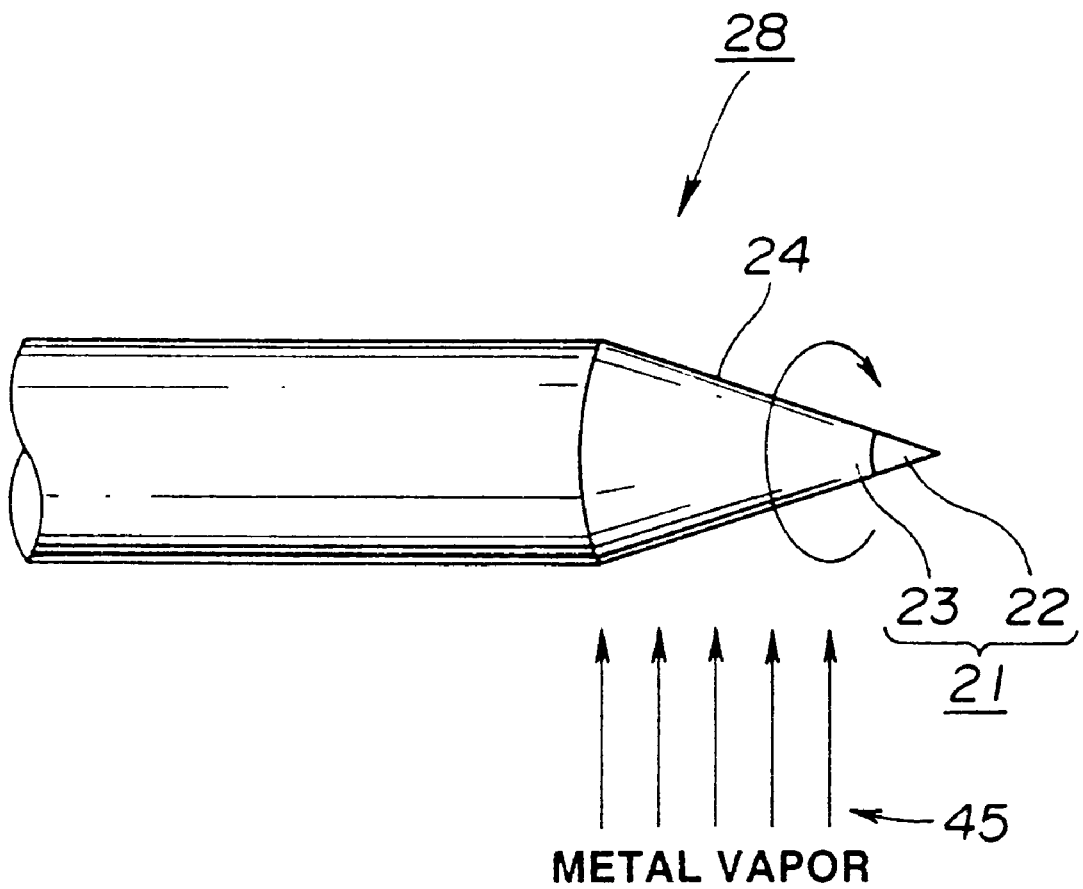
FIG. 19 illustrates an illustrative coating step of an eleventh embodiment of the present invention.

Specifically, a vacuum evaporation unit, as shown for example in FIG. 19, is used. An optical fiber 28 is rotated about its own axis in vacuum and a vapor 45 of gold or chromium is supplied from a direction perpendicular to the center axis or from an obliquely downward position of the pointed end 24 to carry out deposition to form coating layers 25A and 25B at the pointed end 24. Since the optical fiber is conically-shaped, the vapor of chromium or gold can be easily deposited on the surface of the pointed end 24, so that the coating layers 25A and 25B can be formed in a shorter time. The coating layers are not formed at the apex of the pointed end 24, but an aperture 26 is formed.

The result is that an optical fiber having a structure shown for example in FIG. 8 is formed to form a coating layer on the lateral surface of the pointed end 24, while the aperture 26 is formed at the apex of the pointed end 24.

After forming the pointed end 24 by etching the optical fiber 1 by the method for producing the optical fiber shown in FIGS. 18A–18E, and by carrying out etching for 60 to 120 minutes using an etching solution composed of a buffered hydrogen fluoride solution with a volumetric ratio of 10:1:1, an optical fiber 29 can be formed having a sharpened end 24A having a more acute end of the core 22 of the pointed end 24, as shown for example in FIG. 9. Thus it is possible with this method to form the optical fiber 29 having a high aspect ratio, that is a small end angle θ, thereby improving the resolution and detection sensitivity.

With this method, since the sharpened end 24a is formed at the apex of the core 22 of the pointed end 24 by etching continuing for a longer time period, such as 60 to 120 minutes, it becomes possible to reduce the effects caused by shape fluctuations in the pre-etching optical fiber 21.

The above description has been made for a case in which an optical fiber used has the doping ratio of germanium dioxide $GeO_2$ equal to 25 mol % in the core 22. However, the optical fiber having the conically-shaped sharp end 24 as shown in FIG. 7 can be produced using an optical fiber of a lower doping ratio of 3.6 mol % of germanium dioxide $GeO_2$.

With such optical fiber, having a lower doping ratio, since the dissolution rates of the core 22 and the clad 22 in the buffered hydrogen fluoride solution are close to each other, it is not possible to perform selective etching by the four-step etching shown in FIGS. 18A–18E.

That is, with the present method for producing the optical fiber, the end 40 of the optical fiber 21 shown in FIG. 18A is etched by an interface between hydrofluoric acid and a liquid lower in specific gravity than hydrofluoric acid, such as silicon oil, for forming the tapered portion 41 in the clad 23, as shown for example in FIG. 18B.

In the second etching step, the optical fiber, having the tapered portion 41 at its apex, is etched with an etching solution having the volumetric ratio of the buffered hydrogen fluoride solution of 1.5 to 1.7:1:1.

Test results indicate that, by etching for one hour in the second etching step, the conically-shaped sharp end 24 can be formed from the outer periphery of the clad 23 towards the center of the core 22, as in the case of the optical fiber shown in FIG. 7.

With the method for producing the optical fiber of the twelfth embodiment of the present invention, the optical fiber having a shape as shown in FIG. 10 is formed by the sequence of operations shown in FIGS. 20A–20D, using an optical fiber having a clad diameter $d_0$ and a core diameter $d_c$ as a starting sample.

Figure 20A:
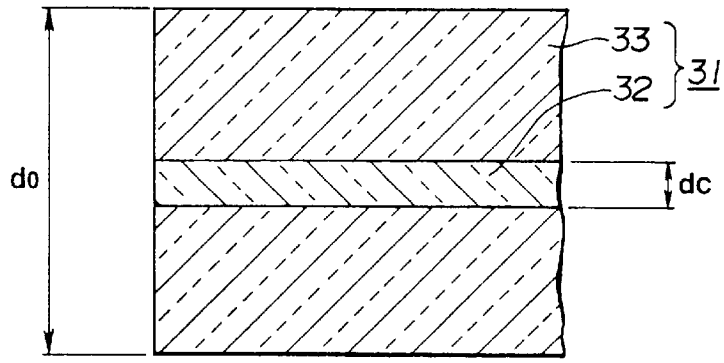
FIGS. 20A–20D are a cross-sectional view of an optical fiber in each step in the method for producing an optical fiber according to the twelfth embodiment.
Figure 20B:
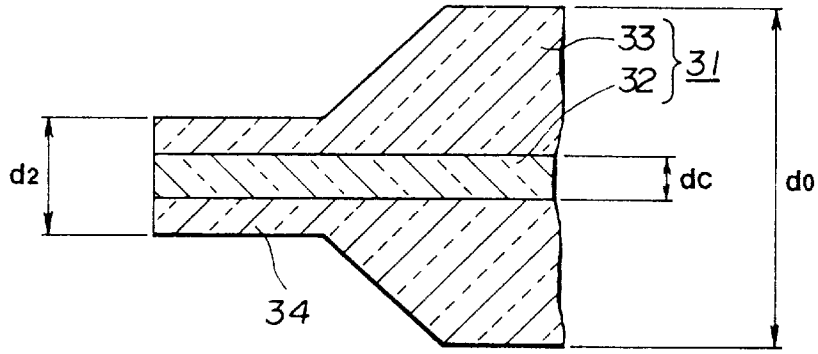

With the present method for processing the optical fiber, an end of an optical fiber 31 shown in FIG. 20A is etched in the first etching step, using a buffered hydrogen fluoride solution having a volumetric ratio X=1.7 of ammonium fluoride $NH_4F$ for reducing the thickness of the clad 33 for forming a reduced-diameter portion 34, as shown in FIG. 20B.

Figure 20C:
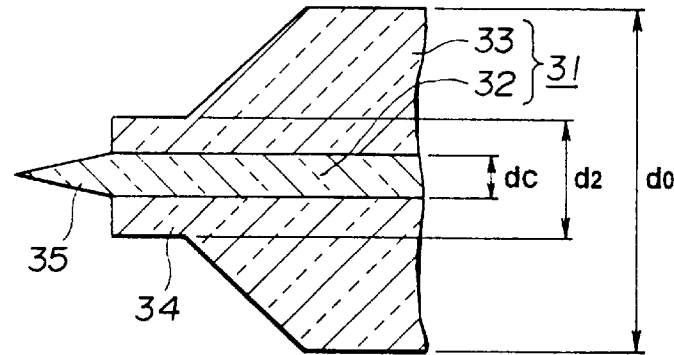

Also, in the second etching step, etching is carried out using a buffered hydrogen fluoride solution having the volumetric ratio X=1.7 or higher of ammonium fluoride $NH_4F$ for producing the sharpened core 35 by sharpening the core 32 at the apex of the reduced-diameter portion 34, as shown in FIG. 20C.

Figure 20D:
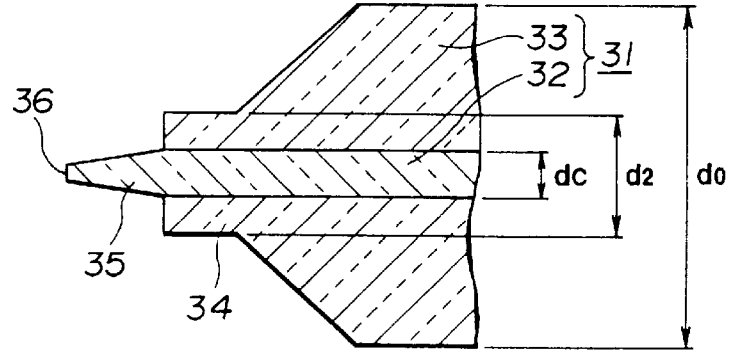

In the third etching step, etching is done using an etching solution which is the hydrofluoric buffer solution for the second etching step, diluted in a ten-fold volume of water, and the etching is completed in a pre-set time as determined by the ratio of germanium dioxide $GeO_2$ added to the core 32 and the composition of the etching solution, for forming a flat apex 36 at the apex of the sharpened core 35, as shown for example in FIG. 20D.

This completes the optical fiber shown in FIG. 10.

The third etching step is further explained in detail.

Figure 21:
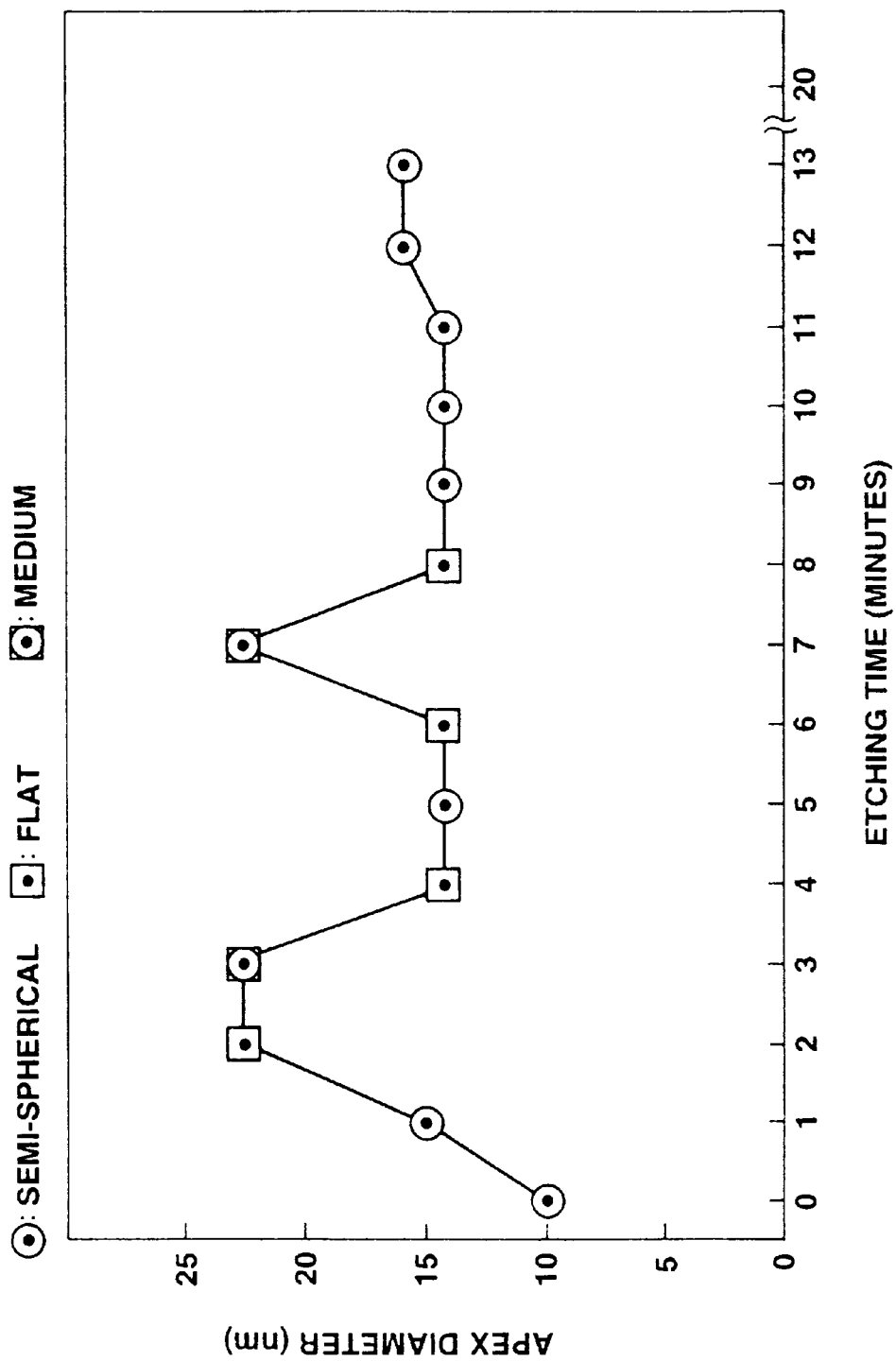
FIG. 21 illustrates an illustrative third etching step in the method for producing an optical fiber according to the twelfth embodiment of the present invention.

The optical fiber 31, having the sharpened core 35 formed by the second etching step, is further etched using an etching solution which is a 10 times diluted form of the etching solution for the second etching step. A phenomenon was observed in which the shape and the diameter of the end of the sharpened core 35 were periodically changed with the progress of the etching, as shown for example in FIG. 21. In FIG. 21, a rectangular symbol denotes the planar state of the apex of the sharpened core 35, while the circular symbol denotes the state in which the apex of the sharpened core 35 is semi-spherical and a rectangular symbol with a circle enclosed therein denotes the state in which the apex of the sharpened core 35 is intermediate between the planar shape and the semispherical shape.

Figure 22:
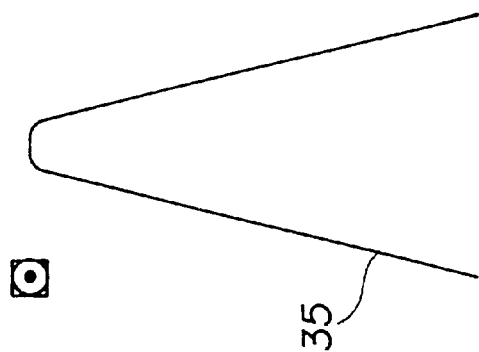
FIG. 22 illustrates etching of an optical fiber in the third etching step.
Figure 23:
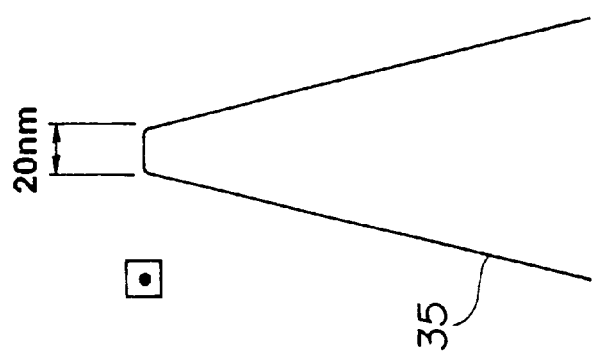
FIG. 23 illustrates etching of an optical fiber in the third etching step.
Figure 24:
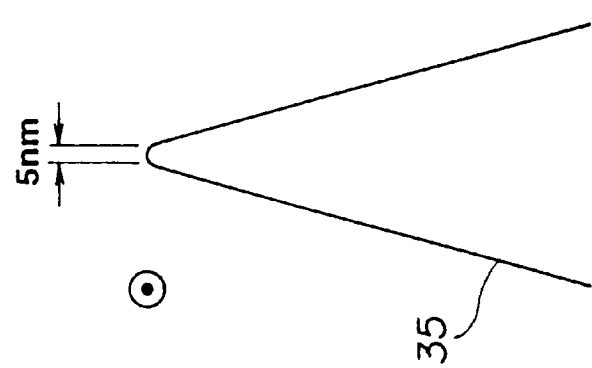
FIG. 24 illustrates etching of an optical fiber in the third etching step.

The apex of the sharpened core 35 is semi-spherical one minute after the start of etching, as shown for example in FIG. 22, becoming planar after two minutes since the start of etching, as shown for example in FIG. 23 and assuming a shape intermediate between the planar state and the semi-spherical shape after three minutes after the start of etching, as shown for example in FIG. 24.

The progress is dependent on the concentration of the etching solution, such that, if etching is carried out using an etching solution which is a 20 times diluted form of the etching solution for the second etching step, the progress of etching becomes substantially similar to that when the etching time shown in FIG. 21 is doubled. It has also been demonstrated that the progress of this phenomenon depends on the ratio of germanium dioxide added to the core 22.

That is, it may be seen that the required shape of the apex of the sharpened core 35 may be obtained if the etching is terminated in a moderate time. Thus, the third etching step is terminated in a pre-set time as determined by the doping ratio of germanium dioxide $GeO_2$ added to the core 22 and the composition of the etching solution.

In this manner, the optical fiber 30 having the structure shown in FIG. 10 is formed, so that the flat apex 36 can be easily formed at the apex of the sharpened core 35.

The method for producing the optical fiber according to the twelfth embodiment of the present invention is now explained.

First, a reduced-diameter portion 34 is formed in the clad 33 shown in FIG. 20B, at one end of the optical fiber 31, in the first etching step, as in the above-described method for processing the optical fiber shown in FIGS. 20A–20D. The sharpened core 35 is then formed in the second etching step by sharpening the core 32, as shown in FIG. 20C. The flat apex 36 is then formed in the third etching step at the apex of the sharpened core 35, as shown in FIG. 20D.

Figure 25:
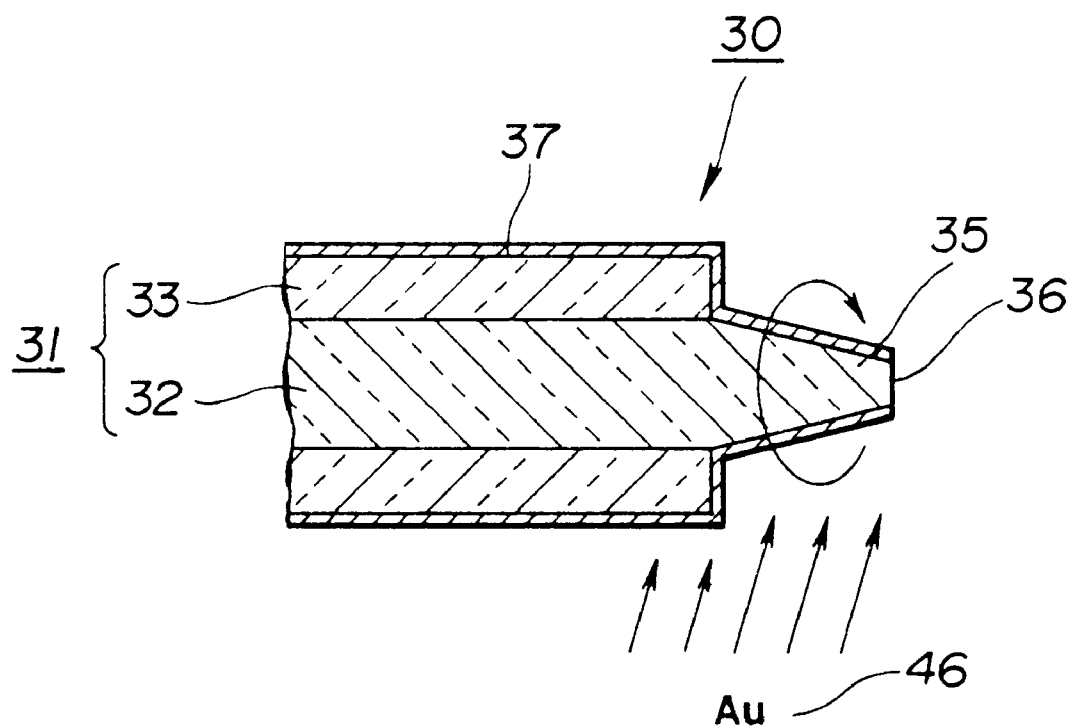
FIG. 25 illustrates a coating step in the method for producing an optical fiber according to the twelfth embodiment of the present invention.

Then, in the chromium coating step, the chromium vapor 46 is supplied from the lateral side of the flat apex 36 or from an obliquely lower portion, as the optical fiber 30 is rotated in vacuum about its own center axis, using a heating boat type vacuum evaporation unit, as shown for example in FIG. 25. This deposits chromium on the lateral surface of the sharpened core 35 for forming the first coating layer 36A. The flat apex 36 is located at this time parallel to the stream of the vapor 46 or in the shadow thereof so that the planar position becomes an aperture without chromium being deposited thereon.

Then, during the gold coating step, as above-described in FIG. 25, the gold vapor 46 is supplied from the lateral side of the flat apex 36 or an obliquely lower portion thereof, as the optical fiber 30 is rotated in vacuum about its own center axis. This deposits gold on the lateral side of the sharpened core 35 for forming the second coating layer 37B. The flat apex 36 is located at the time parallel to the stream of the vapor 46 or in the shadow thereof so that the planar position becomes an aperture without chromium being deposited thereon.

The result is that the coating layer 37 is formed on the sharpened core 35, while the flat apex 36 becomes the aperture.

INDUSTRIAL APPLICABILITY

The optical fiber according to the present invention, described above, has a reduced-diameter portion at one end of the optical fiber obtained by reducing the diameter of the clad, a protrusion protruded from the core at one end of the reduced-diameter portion, a pointed end obtained by sharpening the apex of the protrusion in a tapering fashion, a light-confining coating layer formed on the periphery of the protrusion in continuation to the clad, and an aperture smaller in size than the wavelength of light entering and exiting the core, formed at the apex of the light-confining coating layer.

This optical fiber is used, in a photon scanning tunneling microscope designed to detect the evanescent light localized in an area on the surface of a sample smaller than the wavelength of the light, as an optical probe for detecting the scattered evanescent light proximate to the surface of the sample. The apex of the sharp end scatters the evanescent light on the sample surface and guides the scattered light to the core via the sharp end the scattered light, thus guided, is detected on the opposite side of the core.

The evanescent light, radiated to a portion other than the aperture, is shielded by the light confining coating layer, so that the evanescent light can be selectively entered only at the aperture smaller than the optical wavelength, thus enabling extraneous disturbing light to be interrupted to improve the detection efficiency.

We claim:

1. A method for producing an optical fiber comprising:
   a first etching step of etching an end of an optical fiber made up of a core and a clad with an etching solution composed of an aqueous solution of ammonium fluoride, hydrofluoric acid and water for reducing a diameter of said clad and producing a reduced-diameter portion, said core being made of quartz doped with germanium dioxide and propagating light and said clad being made of quartz and covering said core for confining the light propagated in said core; and
   a second etching step of etching an apex of said reduced-diameter portion with an etching solution composed of an aqueous solution of ammonium fluoride, hydrofluoric acid and water for forming a protrusion of said core and for sharpening the apex of said protrusion in a tapering fashion and forming a pointed end,
   wherein the etching solution used is such a solution composed of a 40 wt % aqueous solution of ammonium fluoride, a 50 wt % hydrofluoric acid and water, and having a volumetric ratio of the aqueous solution of ammonium fluoride, hydrofluoric acid and water of X:1:Y (Y being arbitrary), the etching in said first etching step is carried out using the etching solution with X for which the core dissolution rate is equal to the clad dissolution rate and wherein the etching in said second etching step is carried out using the etching solution with X for which the core dissolution rate is smaller than the clad dissolution rate.

2. The method for producing the optical fiber as claimed in claim 1 wherein chromium and gold are coated in this order on said protrusion for providing a light-confining coating layer and an aperture smaller in size that the wavelength of light entering and exiting said core is formed in the apex of said protrusion.

3. A method for producing an optical fiber comprising:
   a first etching step of etching an end of an optical fiber made up of a core and a clad in an interface between a fluid and an etching solution, said etching solution selected from the group consisting of (a) hydrofluoric acid, and (b) an aqueous solution of ammonium fluoride, hydrofluoric acid and water, said fluid being lower in specific gravity than said etching solution for forming a tapered portion on an apex of said clad, said core being made of quartz doped to a concentration with germanium dioxide for propagating light and said clad being made of quartz and covering said core for confining the light propagated in said core;
   a second etching step of etching said tapered portion with hydrofluoric acid for forming a recess in which the core is receded from the apex of said tapered portion of said clad;
   a third etching step of etching said tapered portion with an etching solution composed on an aqueous solution of ammonium fluoride, hydrofluoric acid and water for forming a flat portion comprised of an apex of the core and the apex of the tapered portion of said clad flush with each other; and
   a fourth etching step of etching said tapered portion with an etching solution composed of an aqueous solution of ammonium fluoride, hydrofluoric acid and water for forming a pointed end conically sharpened from an outer periphery of said clad towards a center of said core.

4. The method for producing the optical fiber as claimed in claim 3 wherein the etching solution used is such a solution composed of a 40 wt % aqueous solution of ammonium fluoride, a 50 wt % hydrofluoric acid and water, and having a volumetric ratio of the aqueous solution of ammonium fluoride, hydrofluoric acid and water of X:1:Y, where Y is arbitrary; and wherein
   the etching in said fourth etching step is carried out using an etching solution with X for which the core dissolution rate is smaller than the clad dissolution rate.

5. The method for producing the optical fiber as claimed in claim 3 further comprising a coating step of coating gold on said pointed end for providing a light-confining coating layer for forming an aperture smaller in size than the wavelength of light entering and exiting the core in the apex of said pointed end.

6. The method for producing the optical fiber as claimed in claim 5 wherein said coating step causing a optical fiber probe to be rotated about its center axis and supplies the gold vapor from the lateral surface or an obliquely lower portion of the pointed end for coating gold on said pointed end while forming an aperture in the apex of said pointed end.

7. A method for producing an optical fiber comprising:

a first etching step of etching an end of an optical fiber made up of a core and a clad in an interface between a fluid and an etching solution, said etching solution selected from the group consisting of (a) hydrofluoric acid, and (b) an aqueous solution of ammonium fluoride, hydrofluoric acid and water, said fluid being lower in specific gravity than said etching solution for forming a tapered portion on an apex of said clad, said core being made of quartz doped to a concentration with germanium dioxide for propagating light and said clad being made of quartz and covering said core for confining the light propagated in said core; and a second etching step of etching said tapered portion with an etching solution composed of an aqueous solution of ammonium fluoride, hydrofluoric acid and water for forming a pointed end conically sharpened from an outer periphery of said clad towards a center of said core.

8. A method for producing an optical fiber comprising:

a first etching step of etching an end of an optical fiber made up of a core and a clad in an interface between a fluid and an etching solution, said etching solution selected from the group consisting of (a) hydrofluoric acid, and (b) an aqueous solution of ammonium fluoride, hydrofluoric acid and water, said fluid being lower in specific gravity than said etching solution for forming a reduced-diameter portion of said clad on one end of the optical fiber and for forming a tapered portion on a proximal end of said reduced-diameter portion, said core being made of quartz doped to a concentration with germanium dioxide for propagating light and said clad being made of quartz and covering said core for confining the light propagated in said core;

a breaking step of breaking said tapered portion at the proximal end thereof; and a second etching step of etching said tapered portion with an etching solution composed of an aqueous solution of ammonium fluoride, hydrofluoric acid and water for forming a pointed end conically sharpened from an outer periphery of said clad towards a center of said core.

9. A method for producing an optical fiber comprising:

a sharpening etching step of etching an end of an optical fiber made up of a core and a clad with an etching solution composed of an aqueous solution of ammonium fluoride, hydrofluoric acid and water for reducing a diameter of said clad for sharpening said core and forming a protrusion, said core being made quartz doped with germanium dioxide for propagating light and said clad being made of quartz and covering said core for confining the light propagated in said core; and a flattening etching step of etching said protrusion with an etching solution composed of ammonium fluoride, hydrofluoric acid and water and terminating the flattening etching in a pre-set time determined by the ratio of germanium dioxide doped to said core and a composition of said etching solution for forming a planar portion on an apex of said protrusion.

10. A method for producing an optical fiber comprising:

a first etching step of etching an end of an optical fiber made up of a core and a clad with an etching solution composed of an aqueous solution of ammonium fluoride, hydrofluoric acid and water for reducing a diameter of said clad and reducing a diameter of an apex of said clad and producing a reduced-diameter portion, said core being made of quartz doped with germanium dioxide for propagating light and said clad being made of quartz and covering said core for confining the light propagated in said core;

a second etching step of etching the apex of said reduced-diameter portion with an etching solution composed of an aqueous solution of ammonium fluoride, hydrofluoric acid and water for sharpening said core for forming a protrusion; and a third etching step of etching the apex of a proximal portion of said clad with an etching solution composed of ammonium fluoride, hydrofluoric acid and water and terminating the third etching step in a pre-set time determined by the ratio of germanium dioxide doped to said core and a composition of said etching solution for forming a planar portion smaller in size than a wavelength of the light on the apex of said protrusion.

11. The method for producing an optical fiber as claimed in claim 10 wherein an etching solution composed of a 40 wt % aqueous solution of ammonium fluoride, 50 wt % hydrofluoric acid and water and having the volumetric ratio of the ammonium fluoride, hydrofluoric acid and water of X:1:1 is used;

etching for said first etching step is performed using the etching solution with X=1.5 to 1.8;

etching for said second etching step is performed using the etching solution with X≧1.7; and etching for said third etching step is performed using an etching solution which is a 5–30 times diluted form of the etching solution with X≧1.7.

12. The method for producing an optical fiber as claimed in claims 9, 10, or 11 further comprising a coating step causing the optical fiber to be rotated in vacuum about its center axis and supplying gold vapor from the lateral side or from an obliquely lower portion of said protrusion for forming a light-confining coating layer on the surface and on the periphery of said protrusion and for forming an aperture in the planar portion.

* * * * *